United States Patent
Sawachi

(10) Patent No.: US 7,970,204 B2
(45) Date of Patent: Jun. 28, 2011

(54) IMAGE PROCESSING DEVICE HAVING IMAGE SENSORS THAT PICK UP AN OBJECT THAT CARRIES OUT AN INSTRUCTING ACTION

(75) Inventor: Youichi Sawachi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 1044 days.

(21) Appl. No.: 11/812,273

(22) Filed: Jun. 18, 2007

(65) Prior Publication Data
US 2008/0056561 A1 Mar. 6, 2008

(30) Foreign Application Priority Data

Aug. 30, 2006 (JP) ................................. 2006-233697

(51) Int. Cl.
G06K 9/00 (2006.01)
G06T 15/10 (2011.01)
G06F 3/033 (2006.01)
A63F 9/24 (2006.01)
G01C 9/00 (2006.01)

(52) U.S. Cl. ........ 382/154; 382/106; 382/107; 345/427; 345/158; 463/31; 715/863; 702/150

(58) Field of Classification Search ................ 382/154, 382/106, 107; 245/158, 427; 463/31; 715/863; 702/150; 348/39
See application file for complete search history.

(56) References Cited

U.S. PATENT DOCUMENTS

| | | | | |
|---|---|---|---|---|
| 5,454,043 A | * | 9/1995 | Freeman | 382/168 |
| 6,031,941 A | * | 2/2000 | Yano et al. | 382/276 |
| 6,445,807 B1 | * | 9/2002 | Katayama et al. | 382/100 |
| 6,476,812 B1 | * | 11/2002 | Yoshigahara et al. | 345/427 |
| 6,795,056 B2 | * | 9/2004 | Norskog et al. | 345/158 |
| 7,333,089 B1 | * | 2/2008 | Gard | 345/157 |
| 2003/0156756 A1 | * | 8/2003 | Gokturk et al. | 382/190 |

(Continued)

FOREIGN PATENT DOCUMENTS

JP 8-211979 A 8/1996

(Continued)

OTHER PUBLICATIONS

Japanese Office Action in a counterpart application (Japanese Patent Application No. 2006-233697) dated Nov. 4, 2009.

*Primary Examiner* — Kathleen S Dulaney
(74) *Attorney, Agent, or Firm* — Sheldon J. Moss; Chad M. Herring

(57) ABSTRACT

An image processing device comprising: a plurality of image pickup sections that pick-up, from respectively different positions, a same object of sensing which carries out an instructing action, and outputting image information thereof; a position information sensing section which, by carrying out stereo matching on the plurality of image information outputted from the plurality of image pickup sections by using, as an object, two-dimensional regions, which correspond to a search space which is a three-dimensional space set in advance as a space in which the instructing action can be carried out, senses position information expressing matching positions which are positions of the object of sensing in the three-dimensional space at points corresponding to one another in the two-dimensional regions; and a specific position sensing section that senses, among the matching positions expressed by the position information, a specific position which is a matching position which matches predetermined conditions, is provided.

14 Claims, 24 Drawing Sheets

U.S. PATENT DOCUMENTS

| | | | |
|---|---|---|---|
| 2004/0056870 A1* | 3/2004 | Shimoyama et al. | 345/629 |
| 2004/0190776 A1* | 9/2004 | Higaki et al. | 382/190 |
| 2004/0222987 A1* | 11/2004 | Chang et al. | 345/419 |
| 2005/0216867 A1* | 9/2005 | Marvit et al. | 715/863 |
| 2008/0013826 A1* | 1/2008 | Hillis et al. | 382/154 |
| 2009/0022369 A1* | 1/2009 | Satoh et al. | 382/106 |

FOREIGN PATENT DOCUMENTS

| | | |
|---|---|---|
| JP | 8-320920 A | 12/1996 |
| JP | 2003-228458 A | 8/2003 |
| JP | 2004-013314 A | 1/2004 |
| JP | 2005-178473 A | 7/2005 |

* cited by examiner

IMAGE PROCESSING DEVICE HAVING IMAGE SENSORS THAT PICK UP AN OBJECT THAT CARRIES OUT AN INSTRUCTING ACTION

CROSS-REFERENCE TO RELATED APPLICATION

This application claims priority under 35 USC 119 from Japanese Patent Application No. 2006-233697, the disclosure of which is incorporated by reference herein.

BACKGROUND

1. Technical Field

The present invention relates to an image processing device.

2. Related Art

In recent years, at various types of electric and electronic devices such as television receivers, air conditioners, audio equipment, and the like, it has become possible to carry out remote operation with respect to the electric or electronic device by using a remote controller. However, the user must set the remote controller nearby, and must be mindful of losing the remote controller, and of the state of wear of the batteries which supply electric power for driving to the remote controller, and the like.

As techniques which can be applied in order to overcome such problems, Japanese Patent Applications Laid-Open (JP-A) Nos. 8-211979, 2005-178473, and 8-320920 disclose techniques which, when an instructing action by the hand of the user is sensed, carry out pattern matching using image information obtained from picking-up the hand.

However, in the techniques disclosed in aforementioned JP-A Nos. 8-211979, 2005-178473, and 8-320920, there are the problems that pattern matching is complex and the sensing time becomes long. Further, in a case of carrying out pattern matching which requires a dictionary for sensing instructing actions by an object such as a hand or the like, there is the problem that erroneous sensing may increase.

SUMMARY

The present invention is developed in order to overcome the above-described problems, and an object thereof is to provide an image processing device which can improve sensing accuracy without leading to an increase in the time for sensing an object.

In order to achieve the above-described object, an image processing device of a first aspect has: a plurality of image pickup sections that pick-up, from respectively different positions, a same object of sensing which carries out an instructing action, and outputting image information expressing images in which the object of sensing is included; a position information sensing section which, by carrying out stereo matching on the plurality of image information outputted from the plurality of image pickup sections by using, as an object, two-dimensional regions, which are regions that are more narrow than a common region included commonly in each of the plurality of images expressed by the plurality of image information, and which correspond to a search space which is a three-dimensional space set in advance as a space in which the instructing action can be carried out, senses position information expressing matching positions which are positions of the object of sensing in the three-dimensional space at points corresponding to one another in the two-dimensional regions; and a specific position that senses section sensing, among the matching positions expressed by the position information sensed by the position information sensing section, a specific position which is a matching position which matches predetermined conditions.

In accordance with the image processing device of the first aspect, image information which express images, which are obtained by a same object of sensing that carries out an instructing action being picked-up from respectively different positions and which contain the object of sensing, are outputted from plural image pickup sections. A position information sensing section carries out stereo matching on the plural image information outputted from the plural image pickup sections, by using, as an object, two-dimensional regions, which are regions more narrow than a common region included commonly in each of the plural images expressed by the plural image information, and which correspond to a search space which is a three-dimensional space set in advance as a space in which the instructing action can be carried out. In this way, the position information sensing section senses position information which expresses matching positions which are positions of the object of sensing in the three-dimensional space at points corresponding to one another in the two-dimensional regions. The specific position sensing section senses, among the matching positions expressed by the position information sensed by the position information sensing section, a specific position which is a matching position which matches predetermined conditions.

In this way, the present invention carries out stereo matching on regions which are more narrow than a common region commonly included in each of the plural images. Therefore, an increase in the time for sensing the object is not brought about to the extent as that when stereo matching is carried out on the overall common region. Further, because it suffices to sense regions which are more narrow than the common region, the sensing accuracy can be improved.

In an image processing device of a second aspect, the specific position that is sensed by the specific position sensing section is a position within a sensing space included in the search space, the sensing space is a space within a rectangular parallelepiped, and the predetermined conditions are that the position information sensed at the position information sensing section exists within the rectangular parallelepiped, and that, in a case in which the matching position does not exist on one surface of two, predetermined, opposing surfaces among surfaces of the rectangular parallelepiped, but exists within a predetermined distance from another surface, the matching position which is nearest to the one surface is made to be the specific position.

In the image processing device of the second aspect, because a position is judged to be the specific position when the above-described conditions are satisfied, erroneous sensing of the specific position can be reduced.

An image processing device of a third aspect further has a consumed electric power controlling section which controls an amount of electric power consumed by the image processing device, wherein the consumed electric power controlling section cancels a low electric power consumption mode when the low electric power consumption mode is set and, after a predetermined time period has elapsed after the specific position sensing section senses the specific position, the specific position sensing section again senses the specific position.

In the image processing device of the third aspect, the low electric power consumption mode can be set when an instructing action is not being carried out. As a result, the amount of electric power which is consumed can be reduced.

An image processing device of a fourth aspect further has: a deriving section that derives a state amount which expresses a state of movement of the specific position sensed by the specific position sensing section; and a sensing section that senses the instructing action on the basis of the state amount derived by the deriving section.

Here, in the image processing device of the fourth aspect, not only is the specific position sensed, but also, movement of the specific position as well can be sensed.

Further, in an image processing device of a fifth aspect, the instructing action is an action which instructs execution of an operation processing which carries out a predetermined operation, and the image processing device further includes: a display section; a control section that effects control such that a predetermined screen corresponding to a cross-section of the three-dimensional space is displayed in a display region of the display section; and a storing section in which the operation processing is stored in advance in association with respective partial regions obtained by dividing the predetermined screen into a plurality of regions, wherein, on the basis of position information of the specific position sensed by the specific position sensing section, the deriving section derives an amount of movement of the specific position along a direction normal to the cross-section, as the state amount which expresses the state of movement of the specific position at a time when the object of sensing moves, and when the amount of movement exceeds a predetermined amount, the sensing section senses, as the instructing action, an action instructing execution of the operation processing which is stored in association with a partial region corresponding to a position in the cross-section of the specific position at that point in time.

In the image processing device of the fifth aspect, due to the user carrying out an instructing action in a space, the user can instruct a predetermined operation just as if he/she were touching the display portion.

In an image processing device of a sixth aspect, the control section further effects control such that a position-indicating image which shows a position of the specific position is displayed at a corresponding position of the specific position in the predetermined screen, and such that a state-indicating portion, which shows the state of movement of the specific position, is displayed at each partial region, and the control section further effects control such that a displayed state of at least one of the position-indicating image and the state-indicating portion, which is displayed at the partial region at a position where the position-indicating image is displayed, changes in accordance with the amount of movement.

In this way, in the image processing device of the sixth aspect, the displayed state is changed in accordance with the amount of movement, and therefore, the operational ease for the user can be improved.

In an image processing device of a seventh aspect, the control section prohibits movement of the specific position along a planar direction of the cross-section, immediately before the amount of movement reaches the predetermined amount.

In this way, in the image processing device of the seventh aspect, it is possible to prevent movement of the specific position due to erroneous operation which can arise while the user is in the midst of operation.

In an image processing device of an eighth aspect, the control section further effects control such that boundary lines, which partition the plurality of partial regions, are displayed on the predetermined screen.

In this way, in the image processing device of the eighth aspect, because boundary lines are displayed, the operational ease for the user can be improved.

An image processing device of a ninth aspect further has a sensing space setting section which sets a position of the sensing space, wherein the sensing space setting section moves a search space, which is substantially an equal distance from each of the image pickup sections and which is positioned in a vicinity of the display section, in accordance with the specific position sensed by the specific position sensing section, and sets, as a position of the sensing space, the specific position at a time when the specific position has not moved for a predetermined time period.

In this way, in accordance with the image processing device of the ninth aspect, the user can set the search space.

In an image processing device of a tenth aspect, the control section effects control such that an image, which is expressed by image information outputted from the image pickup section, and a two-dimensional image, which projects the rectangular parallelepiped expressing the sensing space, are superposed, and a mirror image, which is obtained by mirror-image-converting an image obtained by the superposing, is displayed at a display region of the display section.

Accordingly, in accordance with the image processing device of the tenth aspect, the user can know the position of the sensing space.

An image processing device of an eleventh aspect further has a coordinate rotating section which, in accordance with a positional relationship between the specific position sensed by the specific position sensing section and an origin of the three-dimensional space, rotates the three-dimensional space and makes it a new three-dimensional space.

In this way, in accordance with the image processing device of the eleventh aspect, the three-dimensional space is rotated in accordance with the specific position which the user operates. Therefore, the operational ease for the user can be improved.

In an image processing device of a twelfth aspect, the position information sensing section compares, for each of the image information outputted from the same image pickup section, the plurality of image information outputted from the plurality of image pickup sections and the plurality of image information outputted from the plurality of image pickup sections after a predetermined time period has elapsed, and executes the stereo matching in a case in which different image information exist.

In this way, in accordance with the image processing device of the twelfth aspect, stereo matching is executed only when different image information exists, and therefore, the processing load can be reduced.

In accordance with the present invention, there is provided an image processing device which can improve sensing accuracy, without leading to an increase in the time for sensing an object of sensing.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail hereinafter with reference to the drawings.

Figure 1:
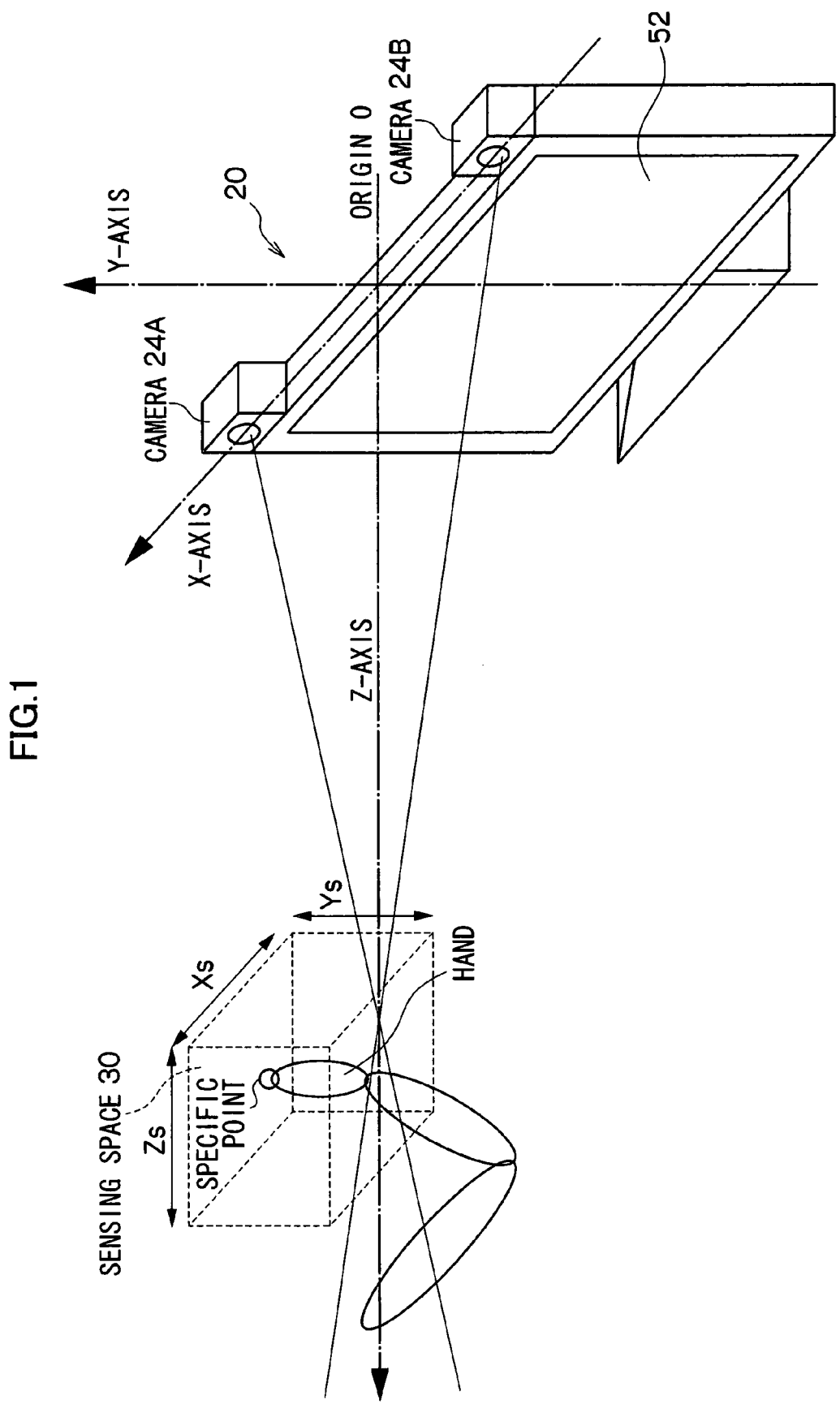
FIG. 1 is a drawing showing the exterior of an image processing device relating to an exemplary embodiment, and a sensing space.

FIG. 1 is a drawing showing the exterior of an image processing device relating to the present exemplary embodiment, and a sensing space. An image processing device 20 is provided with cameras 24A, 24B and a monitor 52. Among these, the monitor 52 displays information such as an operation screen which will be described later, and the like. The monitor 52 may, of course, display usual images and the like such as television, movies, and the like. In the present exemplary embodiment, due to the user moving his/her finger without directly touching the operation screen, the image processing device 20 can be operated remotely just as if the user were touching the operation screen.

As shown in FIG. 1, the cameras 24A, 24B pick-up images from respectively different positions, and output image information expressing images in which an object of sensing is included. In the following explanation, when description common to the cameras 24A, 24B is given, they will be referred to simply as the cameras 24. Note that the cameras 24A, 24B are not limited to carrying out color photographing, and may carry out black-and-white photographing or infrared light photographing. It suffices for the cameras 24A, 24B to be able to carry out photographing such that stereo matching can be carried out in accordance with the photographed images.

A sensing space 30 exists within both angles of view of the cameras 24A, 24B, and shows the space in which the image processing device 20 senses an object, and is the space within a rectangular parallelepiped. However, in the present exemplary embodiment, the sensing space 30 is a space within a cube, which is a particular rectangular parallelepiped. Note that the sensing space 30 is preferably set to about a size in which the palm of a hand, which is the object of sensing, is contained. A cube whose one side is approximately 20 cm is an example of the sensing space.

In order to express the points within the sensing space 30 by coordinates, a three-dimensional coordinate corresponding to a cube is used at the image processing device 20. In the present exemplary embodiment, as shown in FIG. 1, a straight line which is parallel to a line segment connecting the cameras 24A, 24B is made to correspond to the X-axis. Further, a straight line which is parallel to the vertical direction of the image processing device 20 is made to correspond to the Y-axis. The axis perpendicularly intersecting the X-axis and the Y-axis is made to be the Z-axis.

An origin O of the three-dimensional coordinate which is structured in this way is set on the image processing device 20 as shown in FIG. 1. Note that the above-described three-dimensional coordinate is a coordinate for expressing points, and therefore, it is possible for the origin O to not be the position shown in FIG. 1.

Further, a specific position (hereinafter called specific point) and a hand are shown in FIG. 1. The specific point is a point which is used in processing relating to the operation by the user which will be described later, and, in the present exemplary embodiment, corresponds to the user's fingertip. Details regarding the specific point will be described later.

Next, the hardware structure of the image processing device 20 will be described by using FIG. 2. The image processing device 20 has a CPU (Central Processing Unit) 40, a RAM 42, a ROM 44, an HDD (Hard Disk Drive) 46, the monitor 52 and a camera I/F (interface) 54, and these are electrically connected by a bus. Further, the image processing device 20 has the above-described cameras 24A, 24B.

Among these, the CPU 40 governs the overall processing relating to the image processing device 20, and the processings shown in the flowcharts which will be described later are executed by the CPU 40. The RAM 42 is a volatile storage device in which the programs executed by the CPU 40, the image data obtained from the cameras 24, and the like are expanded. Further, the RAM 42 is used at times when the CPU 40 stores data in the flowcharts which will be described later. The ROM 44 is a nonvolatile storage device in which a boot program, which is executed at the time when the image processing device 20 is started-up, and the like are stored. The HDD 46 is a nonvolatile storage device in which the above-described programs and data and the like are stored. The camera I/F 54 is an interface for connecting the cameras 24 and the CPU 40, such as, for example, a USB interface, an IEEE 1394 interface, or the like.

Figure 3:
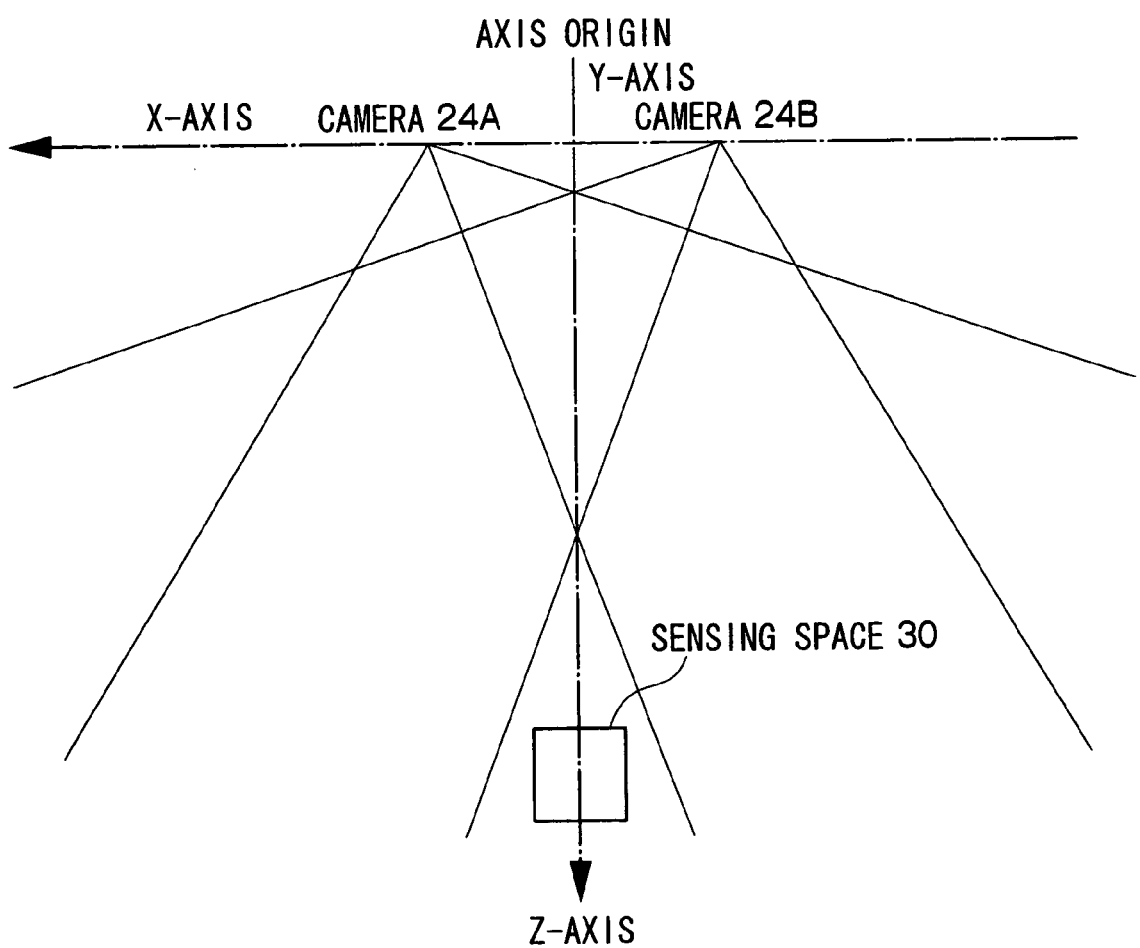
FIG. 3 is a drawing showing the image processing device and the sensing space as seen from a Y-axis direction (i.e., as seen from above)
Figure 4:
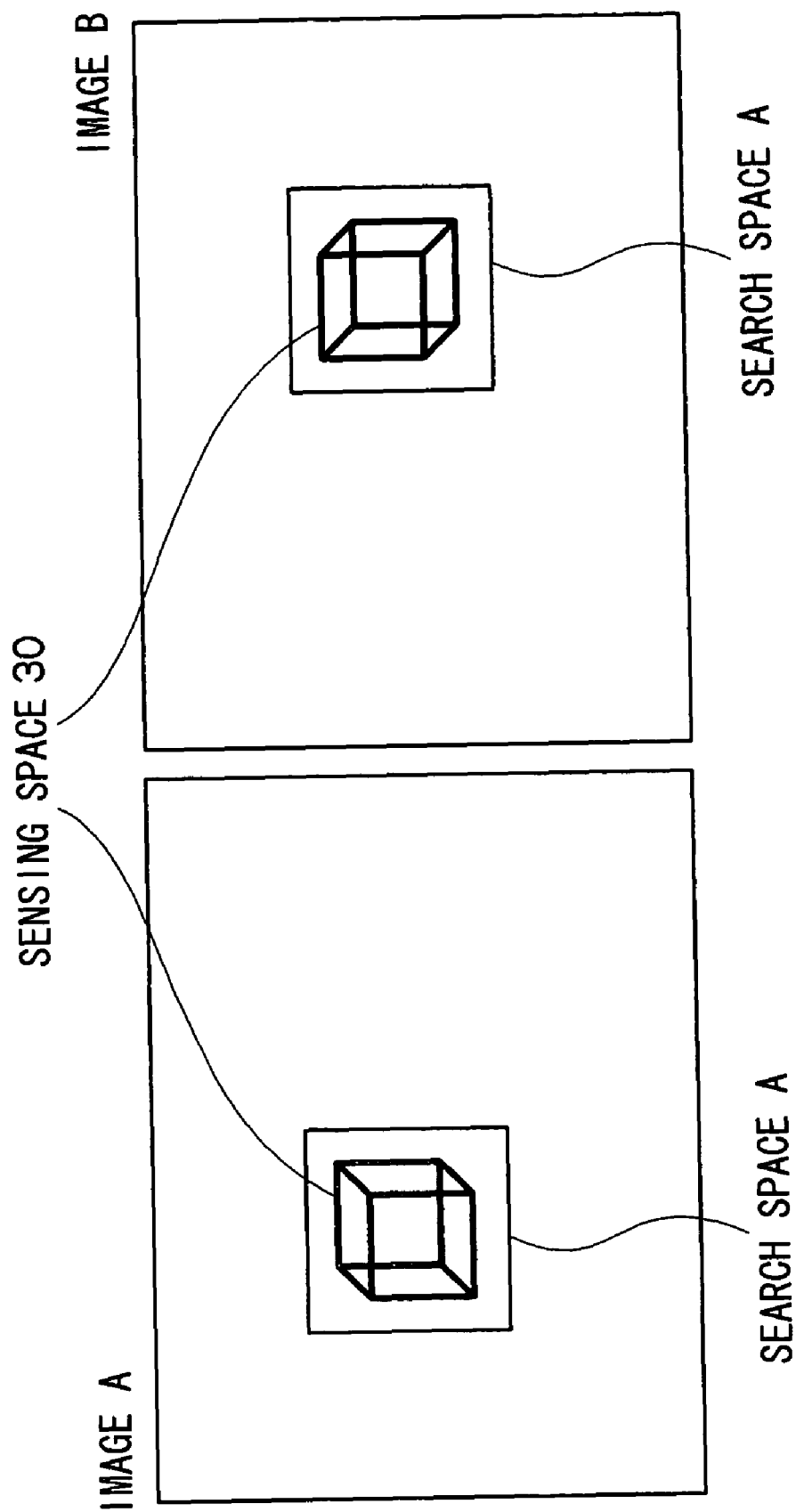
FIG. 4 is a drawing showing image A and image B on which a wireframe stereoscopic image is superposed.

The processing executed by the above-described structure will be described. First, the stereo matching processing in the present exemplary embodiment will be described. Any of various methods which are conventionally used can be used for the stereo matching processing. Specific description is given by using FIGS. 3 and 4. FIG. 3 is a drawing showing the image processing device 20 and the sensing space 30 as seen from the Y-axis direction (i.e., as seen from above). FIG. 3 shows that the sensing space 30 exists within the angles of view of the cameras 24 which are shown by the solid lines. Further, FIG. 4 shows an image A which is photographed by the camera 24A and an image B which is photographed by the camera 24B. Cubes expressing the sensing space 30 are also depicted in the images A, B.

In this way, in the present exemplary embodiment, in the same way as in conventional stereo matching processing, stereo matching processing is executed in accordance with the parallax image using the images A, B photographed by the two cameras 24. However, as compared with conventional stereo matching processing, the present exemplary embodiment differs with regard to the point that stereo matching processing is executed only at search spaces A, B which include the sensing space 30, within the images photographed by the cameras 24. These search spaces are regions which are more narrow than a common region which is included commonly in each of the plurality (here, two) of images expressed by the image information outputted from the cameras 24, and are spaces which are set in advance as spaces in which the aforementioned instructing action can be carried out.

Accordingly, in the present exemplary embodiment, because there is no need to carry out stereo matching processing on the overall images as is the case with conventional stereo matching processing, the processing time of the image processing device 20 can be greatly shortened.

Note that there are various stereo matching processing methods, and any thereamong can be applied provided that it is a method which carries out processing in accordance with the aforementioned parallax image. Specific examples of stereo matching processing methods are, for example: a characteristic point extracting method in which a portion where the change in brightness is great, such as a contour edge of an image or the like, is detected, and a correlation is obtained; a region base method which obtains a correlation from the differences between left and right images in units of n×m pixels blocks; a brightness curve method which expresses brightnesses as contour lines, detects the pattern of the contour lines, and obtains a correlation; and the like.

Further, three or more cameras may be provided, and stereo matching processing may be executed by using the images obtained therefrom. In this case, more accurate stereo matching processing is possible.

The processings executed by the CPU 40 of the image processing device 20 will be described hereinafter by using flowcharts.

Figure 5:
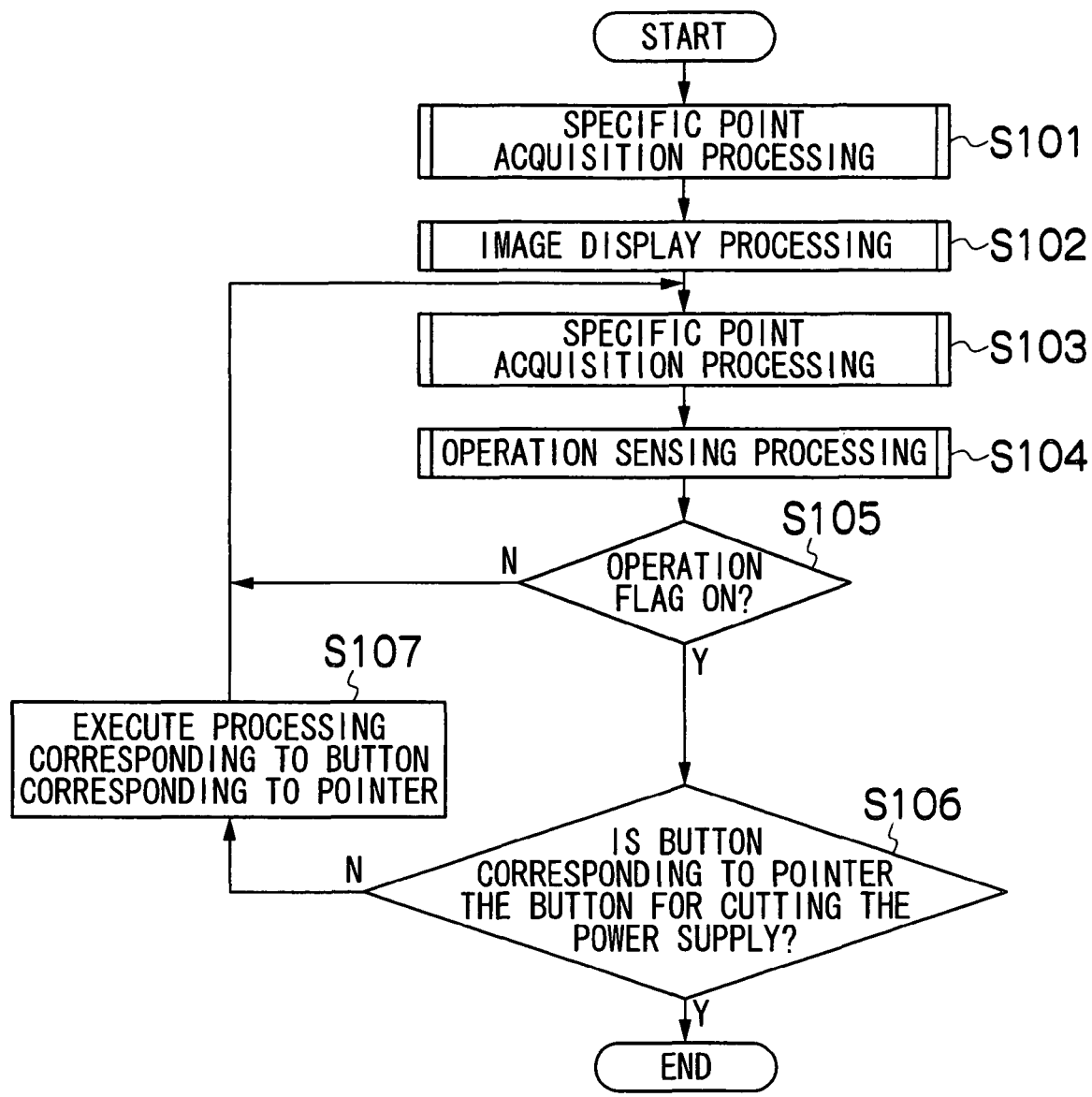
FIG. 5 is a flowchart showing the flow of overall processings from the sensing of a fingertip of a user to the sensing of operation thereof.

FIG. 5 is a flowchart showing the overall processing from the sensing of a fingertip of the user to the sensing of operation thereof. Note that details of the functions (subroutines) shown in FIG. 5 will be described later.

First, in step 101, the CPU 40 executes specific point acquisition processing. In next step 102, the CPU executes image display processing which displays a screen which a user operates. Thereafter, in step 103, the CPU 40 again executes the specific point acquisition processing. In next step 104, the CPU 40 executes operation sensing processing which senses operation (instructing action) of the user.

Due to this operation sensing processing, in a case in which an operation is sensed as will be described later, an operation flag is set to on, and in a case in which no operation is sensed, the operation flag is set to off. In step 105, the CPU 40 judges whether or not the operation flag is on. If the operation flag is off, the processing of step 103 is executed again. If the operation flag is on, in step 106, the CPU 40 judges whether or not that operation is an instructing action for cutting the power supply to the image processing device 20. If the operation is for cutting the power supply, processing ends. If the operation is other than for cutting the power supply, in step 107, the CPU 40 executes processing in accordance with a button corresponding to a pointer, and again executes the processing of step 103.

Hereinafter, aforementioned step 101 through step 104 will be described in detail in that order. Note that, in the following explanation, camera 24A and camera 24B will be referred to as camera A and camera B, respectively.

First, the flow of the specific point acquisition processing of step 101 will be described by using the flowchart of FIG. 6. First, in step 201, the CPU 40 executes matching position sensing processing. This matching position sensing processing is processing carrying out setting of the aforementioned sensing space, and sensing of a finger itself. In next step 202, the CPU 40 carries out specific point sensing processing. This specific point sensing processing is processing which senses the specific point. The specific point in the present exemplary embodiment is, as described above, a fingertip. In next step 203, the CPU 40 judges whether or not the specific point is sensed. If the specific point is sensed, the CPU 40 ends processing, whereas if the specific point is not sensed, the CPU 40 again executes the processing of step 201.

Figure 7:
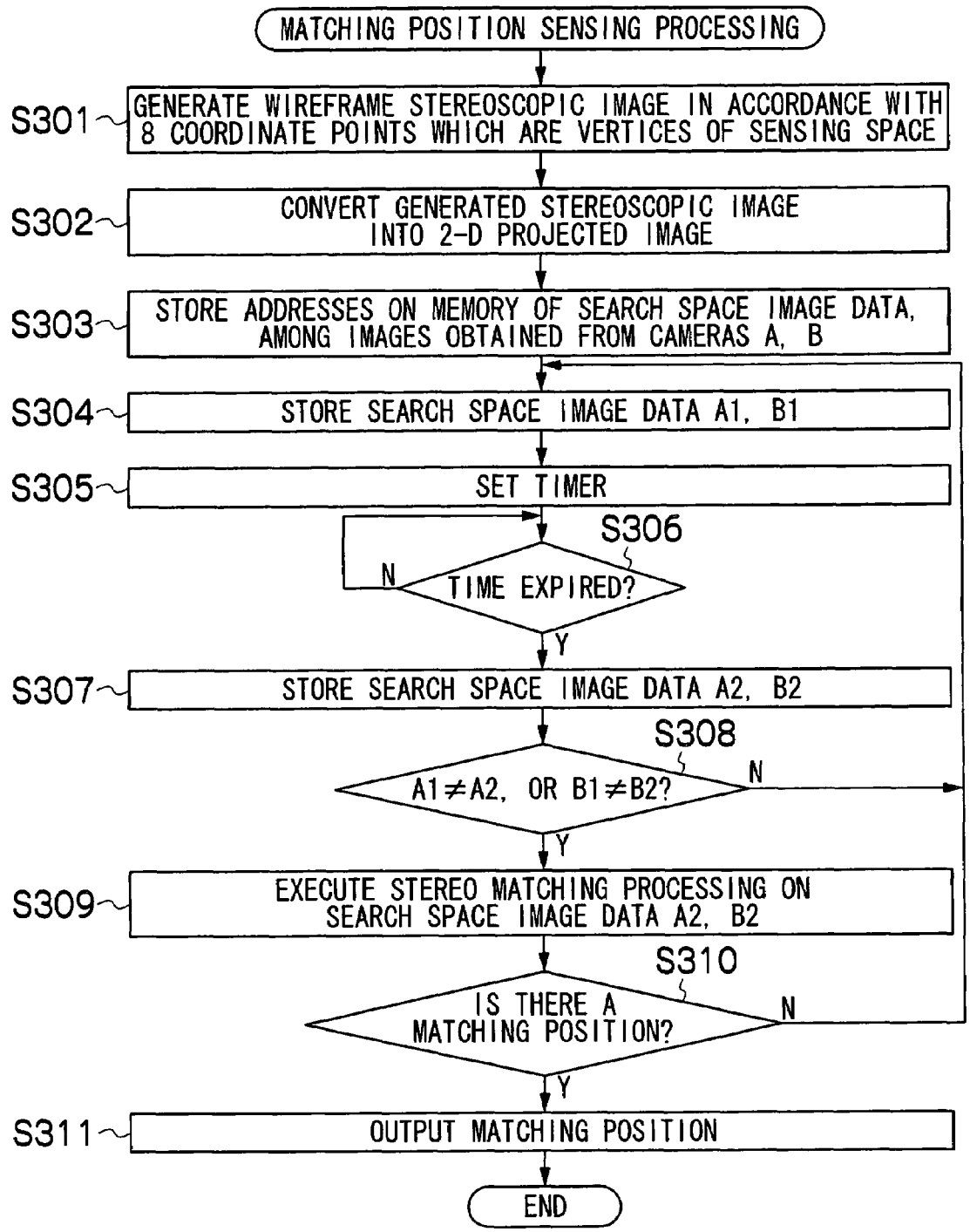
FIG. 7 is a flowchart showing the flow of matching position sensing processing.

Next, the flow of the matching position sensing processing of aforementioned step 201 will be described by using the flowchart of FIG. 7.

In step 301, the CPU 40 generates a wireframe stereoscopic image in accordance with the eight coordinate points which are the vertices of the sensing space which is a cube. In step 302, the CPU 40 converts this wireframe stereoscopic image into a two-dimensional projected image, and obtains a wireframe image.

In next step 303, the CPU 40 stores the addresses, on the aforementioned RAM 42, of search space image data which express the search spaces of the image data obtained from the cameras A, B. The images, which are obtained by superposing the images which these search space image data express and the aforementioned wireframe image, are the images shown in FIG. 4.

Next, in step 304, the CPU 40 stores search space image data A1, B1. Note that the search space image data A1 and search space image data A2, which will be described later, are image data expressing the search space obtained by camera A. The search space image data B1 and search space image data B2, which will be described later, are image data expressing the search space obtained by camera B.

When the search space image data are stored, the CPU 40 sets a timer in step 305. This timer is a timer for sensing changes in the images. When the CPU 40 judges in step 306 that the time on the timer has expired, in step 307, the CPU 40 stores the search space image data A2, B2 among the image data actually obtained at cameras A, B.

In subsequent step 308, the CPU 40 judges whether or not changes have arisen in the images. Namely, the CPU 40 judges whether or not the search space image data A1, A2 differ, or whether or not the search space image data B1, B2 differ.

At the CPU 40, if the judgment in step 308 is negative, the processing of step 304 is again executed. On the other hand, if the judgment in step 308 is affirmative, because a change has occurred in an image, in step 309, the CPU 40 executes stereo matching processing on the search space image data A2, B2. In this way, the plural image data which are outputted from the cameras 24, and the plural image data which are outputted from the cameras 24 after a predetermined time period has passed, are compared for each image data outputted from the same camera, and if different image data exists, stereo matching is executed. Therefore, the burden on the CPU 40 can be reduced, and the amount of electric power consumed can thereby also be reduced.

By this stereo matching processing, the CPU 40 judges in step 310 whether or not a matching position exists.

Here, a matching position is a position of the object of sensing in the search space (three-dimensional space) at corresponding points of the images (the two-dimensional regions) expressed by the search space image data sensed by the stereo matching processing. Accordingly, in the case of a hand or an arm, a large number of matching positions exist in accordance with the shape thereof.

In step 310, if no matching position exists, the processing of step 304 is executed again. If there is a matching position, in step 311, the CPU 40 outputs the matching position as a return value.

In this way, if there is a change in at least either one of the images, by carrying out the above-described stereo matching processing, there are the advantages that the resource margin of the CPU can be ensured, and also, the consumed electric power can be reduced. Further, the read-out ranges of the image-pickup elements provided at the cameras 24 also may be limited to within the search spaces.

Figure 8:
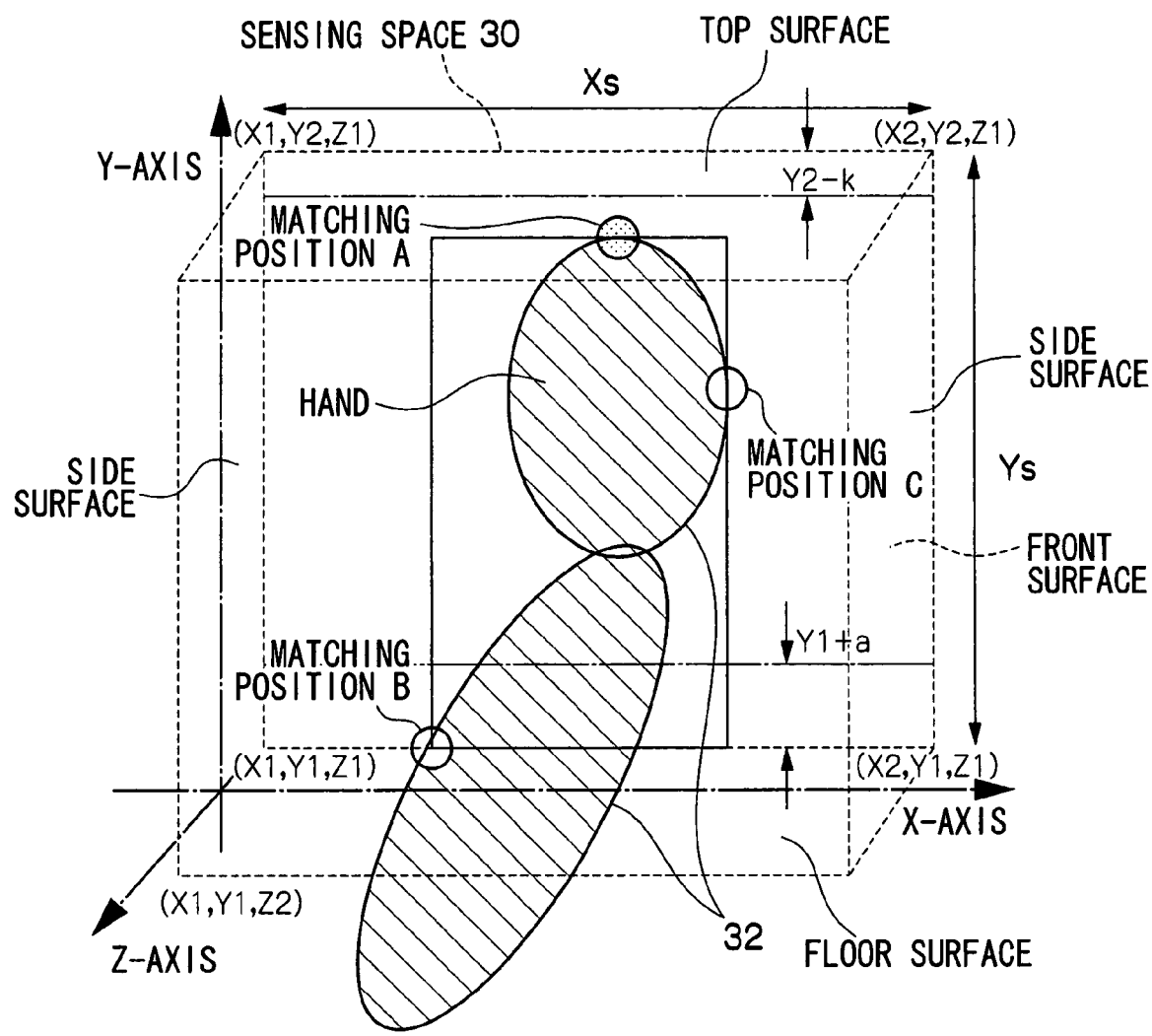
FIG. 8 is a schematic drawing showing a specific point.

When it is sensed by the above-described matching position sensing processing that some type of object exists, next, specific point sensing processing which senses the specific point is executed. First, the specific point will be explained. The specific point is a matching position which satisfies specific conditions, among the matching positions within the sensing space. This will be described concretely by using FIG. 8. FIG. 8 is a schematic drawing showing the specific point. The above-described sensing space 30, an object (in the drawing, a hand) 32, and three matching positions A, B, C are shown on the three-dimensional coordinate in FIG. 8.

The matching positions are expressed by three-dimensional coordinates. Although a large number of matching positions are sensed, only three are illustrated in FIG. 8 for easier understanding.

Figure 9:
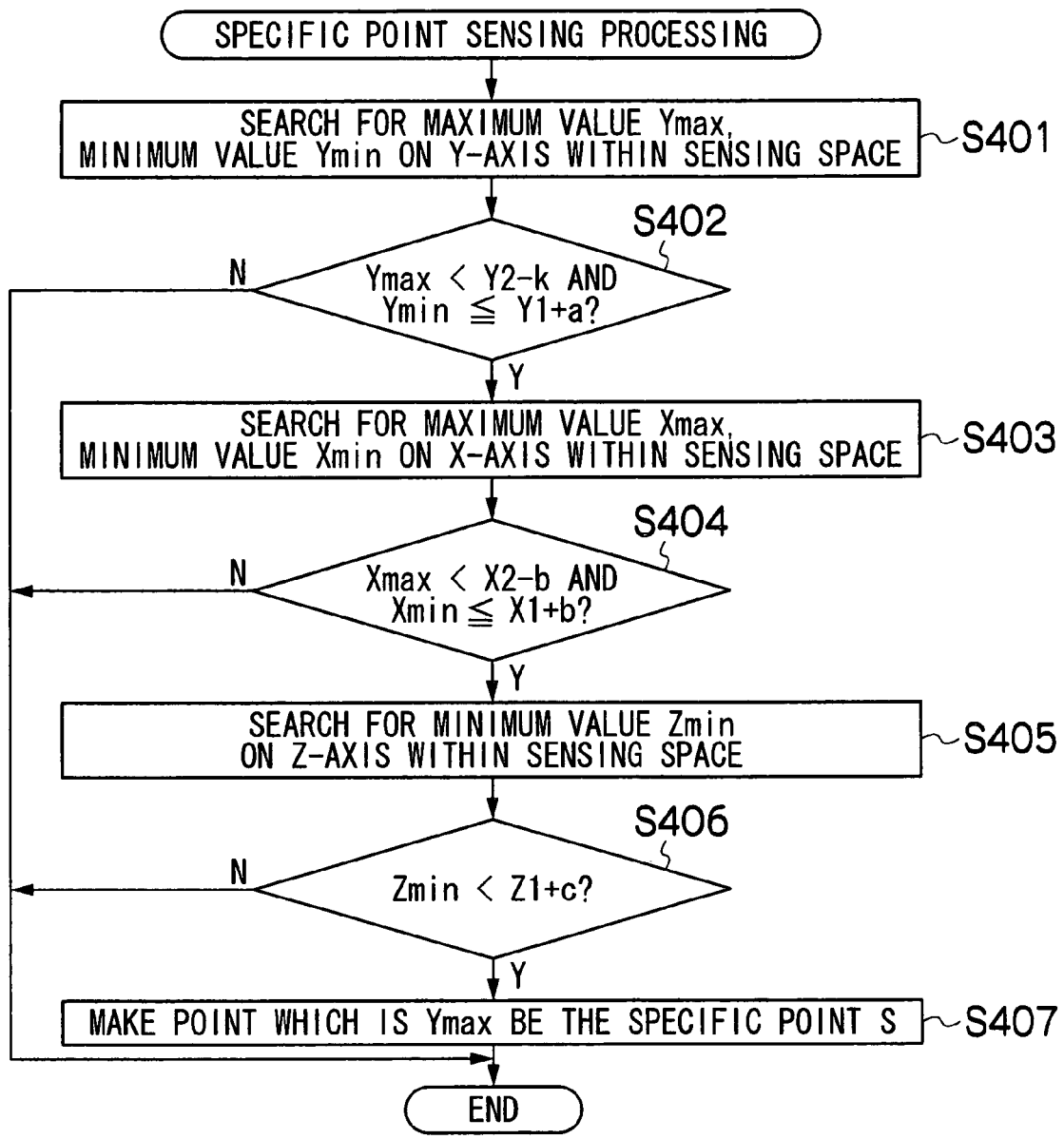
FIG. 9 is a flowchart showing the flow of specific point sensing processing.

In the present exemplary embodiment, because the fingertip is the specific point, the matching position A shown in FIG. 8 is sensed as the specific point. The specific point sensing processing which senses the specific point will be described concretely by using the flowchart of FIG. 9. Note that Y1, Y2, X1, X2, Z1 which are used in this flowchart are the coordinate values expressing the vertices of the sensing space shown in FIG. 8.

First, in step 401, the CPU 40 searches for a maximum value Ymax and a minimum value Ymin on the Y-axis of the matching positions which are within the sensing space. Next, in step 402, the CPU 40 judges whether or not Ymax<Y2−k and Ymin≦Y1+a.

First, Ymax<Y2−k is for judging that the object 32 within the sensing space is not penetrating through the top surface of the sensing space. Note that this k (see FIG. 8) is a value which provides the position where the point, which should be the specific point, exists with leeway of a certain extent from the top surface of the interior of the sensing space.

Further, Ymin≦Y1+a is for judging whether or not a matching position in accordance with the object within the sensing space is sufficiently near the floor surface of the sensing space (exists within distance a from the floor surface).

If the judgment in step 402 is negative, the CPU 40 ends processing. If the judgment is affirmative, in next step 403, the CPU 40 searches for a maximum value Xmax and a minimum value Xmin on the X-axis of the matching positions within the sensing space.

Subsequently, in step 404, the CPU 40 judges whether or not Xmax<X2−b and Xmin≦X1+b. This judgment is a judgment as to whether or not Xmax and Xmin are between X1 and X2. In this way, it is judged that the object 32 is not penetrating through any of the side surfaces of the sensing space.

If the judgment is negative in this step 404, the CPU 40 ends processing. If the judgment is affirmative, in next step 405, the CPU 40 searches for a minimum value Zmin on the Z-axis of the matching positions in the sensing space.

Subsequently, in step 406, the CPU 40 judges whether or not Zmin<Z1+c. This judgment is a judgment as to whether or not Zmin is smaller than Z1 which is the coordinate value on the Z-axis of the front surface of the sensing space. In this way, it is judged that the object 32 is not penetrating through the front surface of the sensing space.

If the judgment in step 406 is negative, the CPU 40 ends processing. If the judgment is affirmative, in next step 407, the CPU 40 makes the matching position which is Ymax be a specific point S.

In this way, in the present exemplary embodiment, in a case in which all of the matching positions are included within the cube, and none of the matching positions exist on one surface (the top surface) of two predetermined opposing surfaces among the surfaces of the cube, and a matching position exists within the predetermined distance a from the other surface (the floor surface), the matching position which is nearest to that one surface is made to be the specific point.

Note that, in the specific point sensing processing, the processings of above-described steps 404 and 405 may be omitted. This is because, in a case in which the finger is inclined for example, there is the possibility that it is projecting-out from a side surface, but, in this case as well, the fingertip can be sensed.

Figure 10:
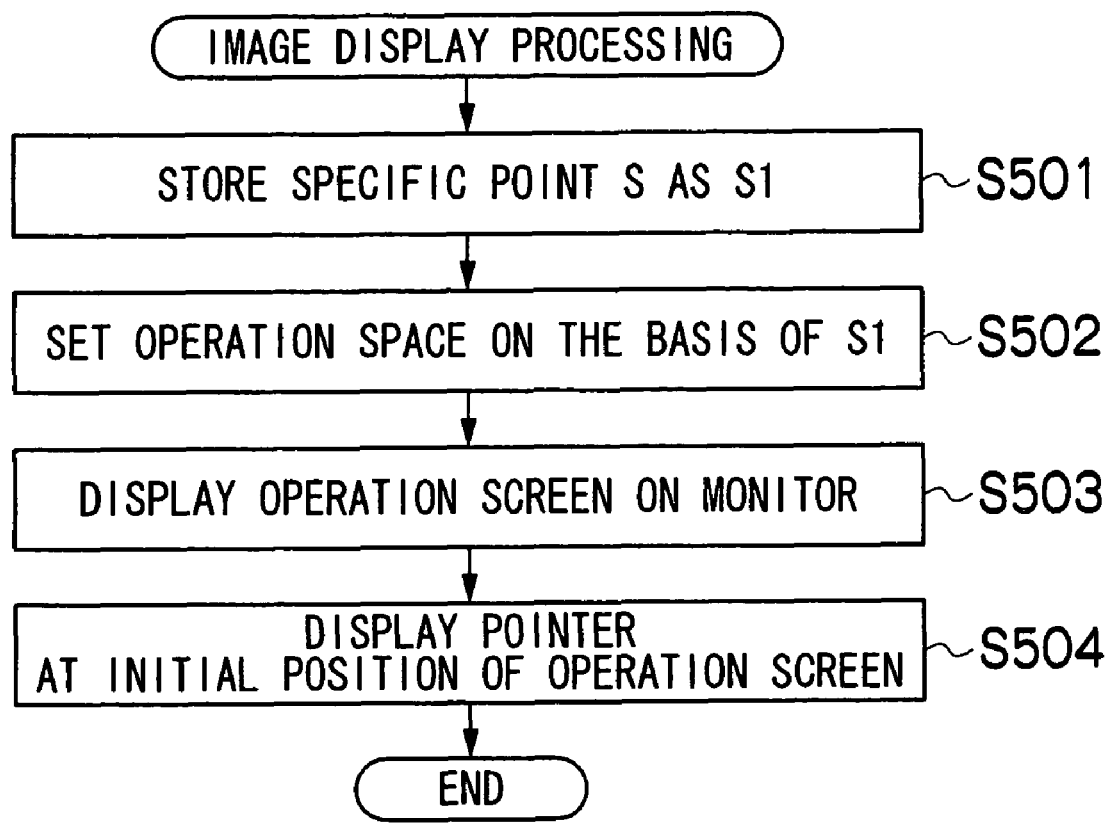
FIG. 10 is a flowchart showing the flow of image display processing.

The CPU 40 displays an operation screen on the basis of the specific point S obtained in this way. The flow of the screen display processing which displays this operation screen will be explained by using the flowchart of FIG. 10. First, in step 501, the CPU 40 stores the specific point S as S1. In next step 502, the CPU 40 sets an operation space on the basis of the specific point S1.

Figure 11:
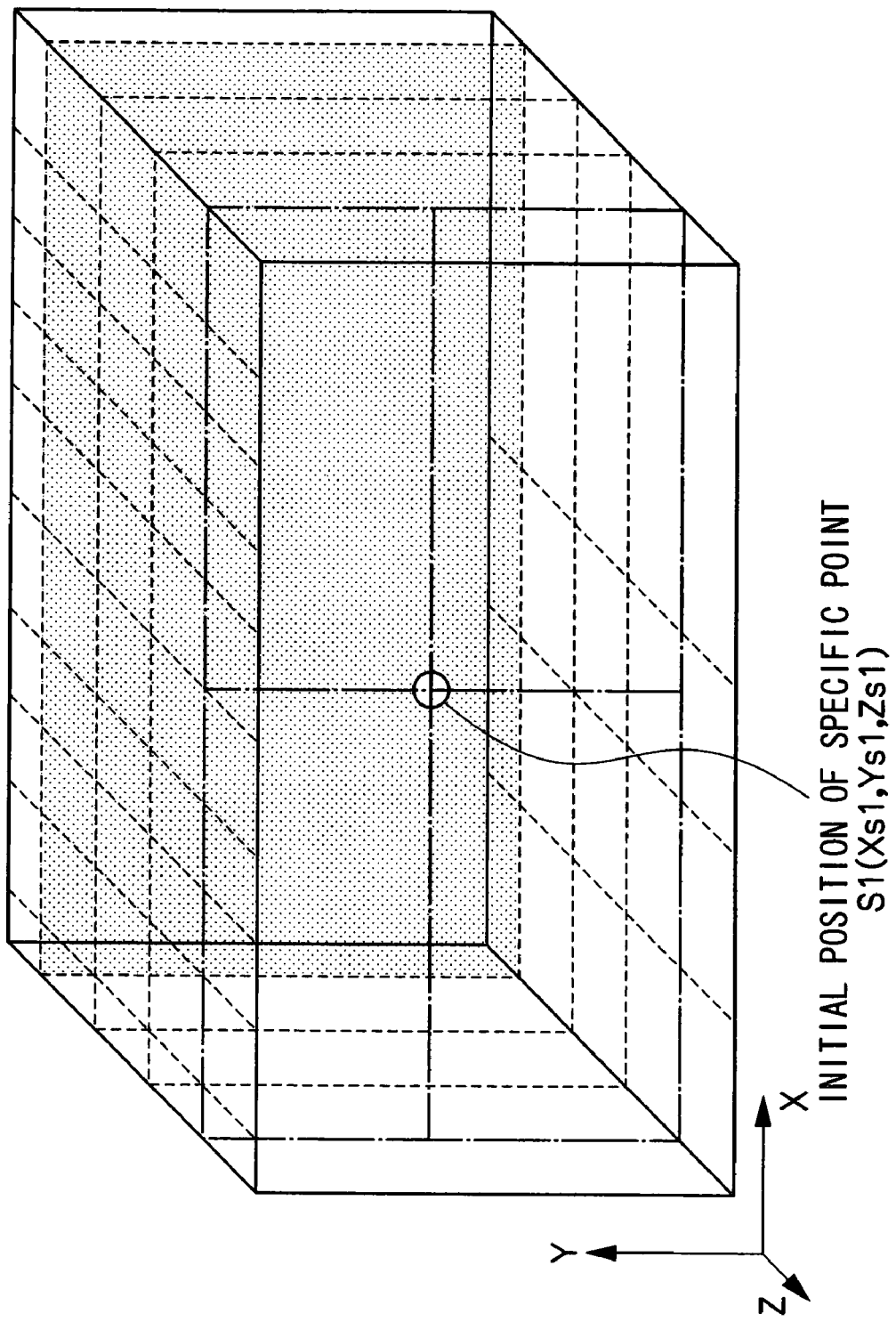
FIG. 11 is a drawing showing an operation space.

This operation space is a space which is of the shape of the parallelepiped shown in FIG. 11, and includes the sensing space, and is included within the search space. The operation space is a space for sensing operation. As shown in FIG. 11, the sizes in the XYZ directions of the operation space are determined in advance on the basis of the specific point S1. The operation space is set in step 502 by setting the respective points of the parallelepiped in accordance with the sizes at the RAM 42 for example.

Figure 12:
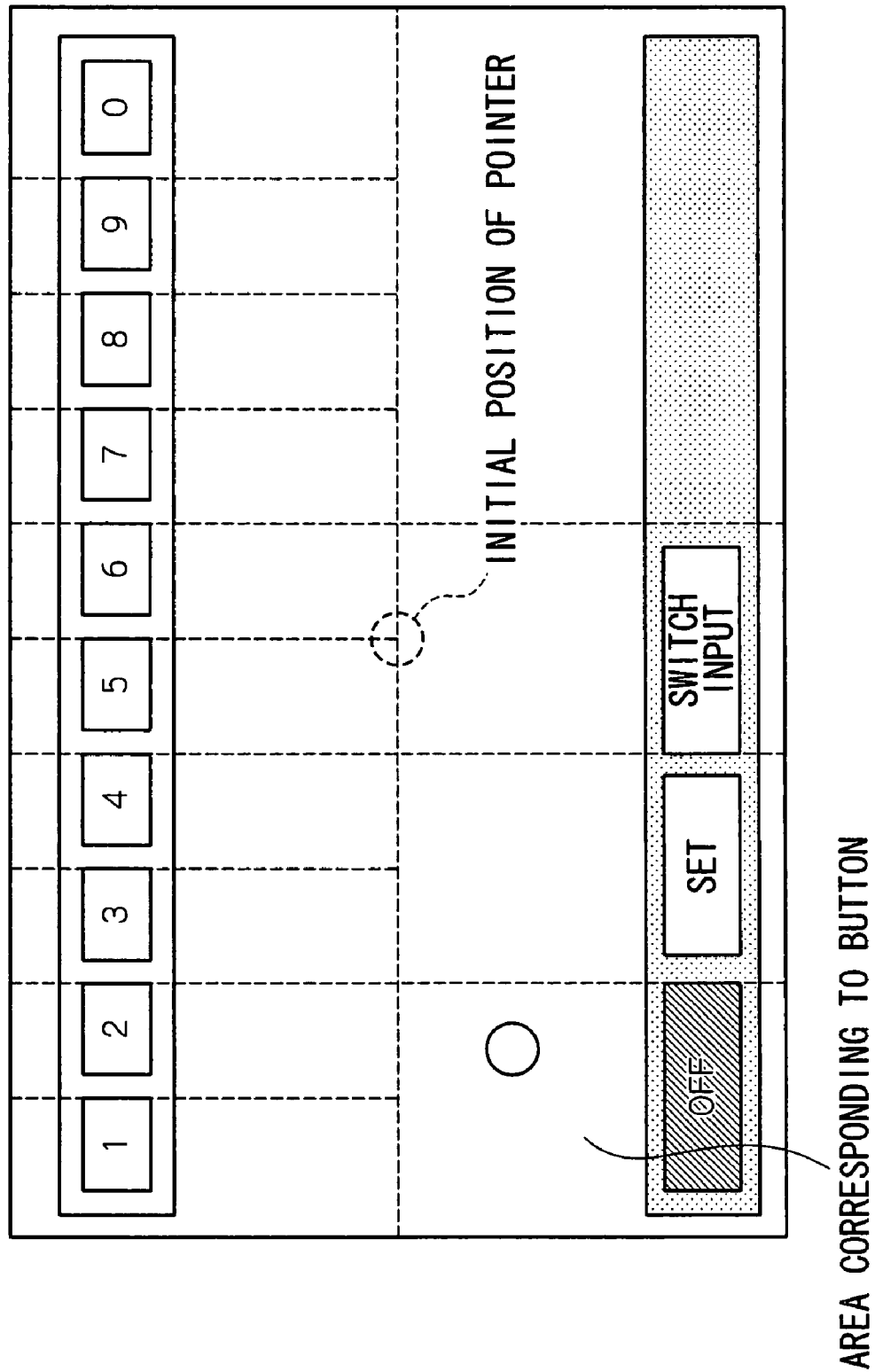
FIG. 12 is a drawing showing an example of an operation screen.

In subsequent step 503, the CPU 40 displays the operation screen on the monitor 52, and, in step 504, displays a pointer (position-indicating image) at an initial position of the operation screen. An example of this operation screen is shown in FIG. 12. The operation screen shown in FIG. 12 is, as an example, a screen which models a remote controller of a television. The aforementioned initial position of the pointer is set at the center of the operation screen, and moves as a pointer shown by a black dot in accordance with the movement of the user's fingertip. Further, in the operation screen, in order to make the operation of the user simple, the borders of areas (partial regions) are shown by dashed lines for each button. When the pointer is moved to within an area, it is considered that the button within that area is being selected. Accordingly, as shown in FIG. 12, the button "OFF", which is within the area in which the pointer shown by the black dot is positioned, is reverse displayed (state displayed), and the user is shown that this button is selected. Instead of reverse display, the user may be shown that a button is selected by the pointer being made into a shape which is different from the usual shape of the pointer.

Note that, because the fingertip moves within the operation space in a state in which the hand or arm is not supported, the movement of the fingertip is unstable. In particular, when the fingertip is moved without changing the depthwise direction (the Z-axis direction), a circular arc which is centered around elbow is drawn in the left-right direction, but this movement is not a difficult movement for the user. However, movement in the vertical direction is accompanied by the rotational motion of the elbow or the shoulder or the like, and is therefore a difficult movement for the user.

Accordingly, due to the difficulty of the action of vertical movement, the operating area is not set to be an area which is sandwiched between the top and bottom, but divided in two into an upper area and a lower area, and further made into areas which are vertically long. Further, the vertical size of one area is, as an example, about the width of a circular arc in a case of moving between both ends of buttons which are lined-up to the left and right, or approximately 15 cm. The width of one area is, as an example, a width of an extent over which a finger can be maintained stably, or approximately 5 cm.

Figure 13:
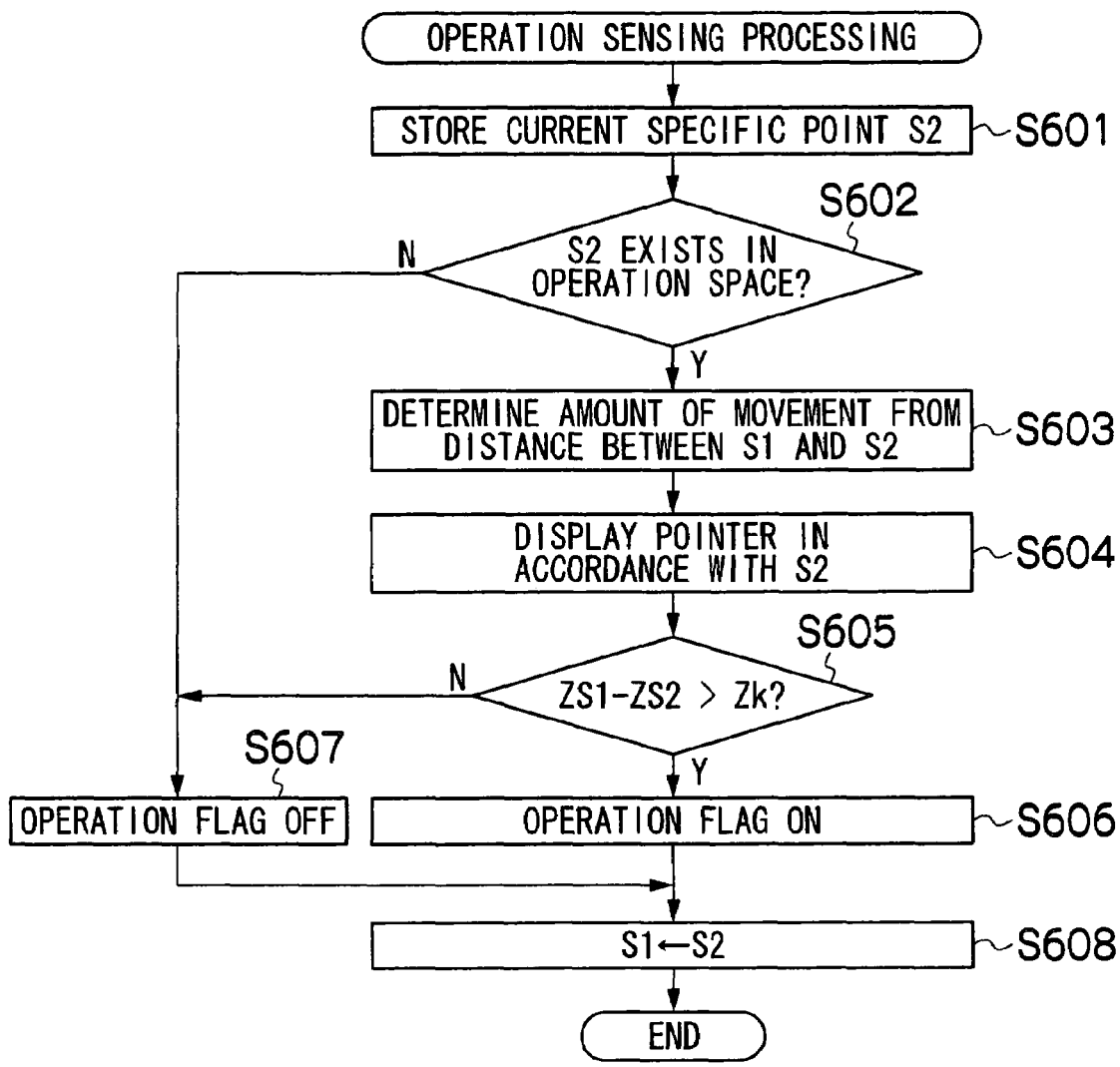
FIG. 13 is a flowchart showing the flow of operation sensing processing.

When the screen is displayed as described above, the specific point acquisition processing (step 103 in FIG. 5) is again executed, and operation sensing processing which senses the operation of the user is executed. The flow of this operation sensing processing will be described by using the flowchart of FIG. 13. First, in step 601, the CPU 40 stores the sensed specific point as a current specific point S2. In next step 602, the CPU 40 judges whether or not the specific point S2 exists in the operation space. The specific point S2 not existing within the operation space shows that the fingertip of the user does not exist within the operation space, and therefore, in step 607, the operation flag which shows whether or not an operation is carried out by the user is turned off which shows that the operation is not being carried out. The operation flag, such as expressing "off" with "0" for example, takes-out a value from the RAM 42 in which the operation processings are stored in advance in association with the respective areas, and by substituting this value in as the value corresponding to the button, the operation flag shows which button is being pressed.

If the judgment is affirmative in step 602, in next step 603, the CPU 40 determines the moved amount from the distance between the specific point S1 and the specific point S2. For example, the Euclidean distance or the like can be used as this distance. On the basis of this moved amount, in step 604, the CPU 40 displays the pointer in correspondence with the specific point S2.

Thereafter, in step 605, the CPU 40 judges whether or not a value, which is equal to a Z-coordinate value ZS1 of the specific point S1 minus a Z-coordinate value ZS2 of the specific point S2, is greater than a predetermined coordinate value Zk. This judgment is a judgment as to whether or not the user has moved his/her fingertip toward the monitor 52, i.e., whether or not the user has carried out the action of pressing the button. This coordinate value Zk is a value for judging that the user has pressed the button. The coordinate value Zk may be set by the user, or may be determined appropriately in accordance with the shape of the button or the like.

When the judgment in above step 605 is negative, it shows that an operation has not been carried out by the user, and therefore, processing moves on to above-described step 607. If the judgment in step 605 is affirmative, in step 606, the CPU 40 turns the operation flag on, which shows that an operation is carried out, and, in next step 608, replaces the specific point S1 with the specific point S2 (substitutes the specific point S2 in for the specific point S1). Because the specific point which will be obtained the next time will be the current specific point at that point in time, this replacement is processing for storing the specific point S2 which is the current specific point to be compared with that specific point.

Figure 14:
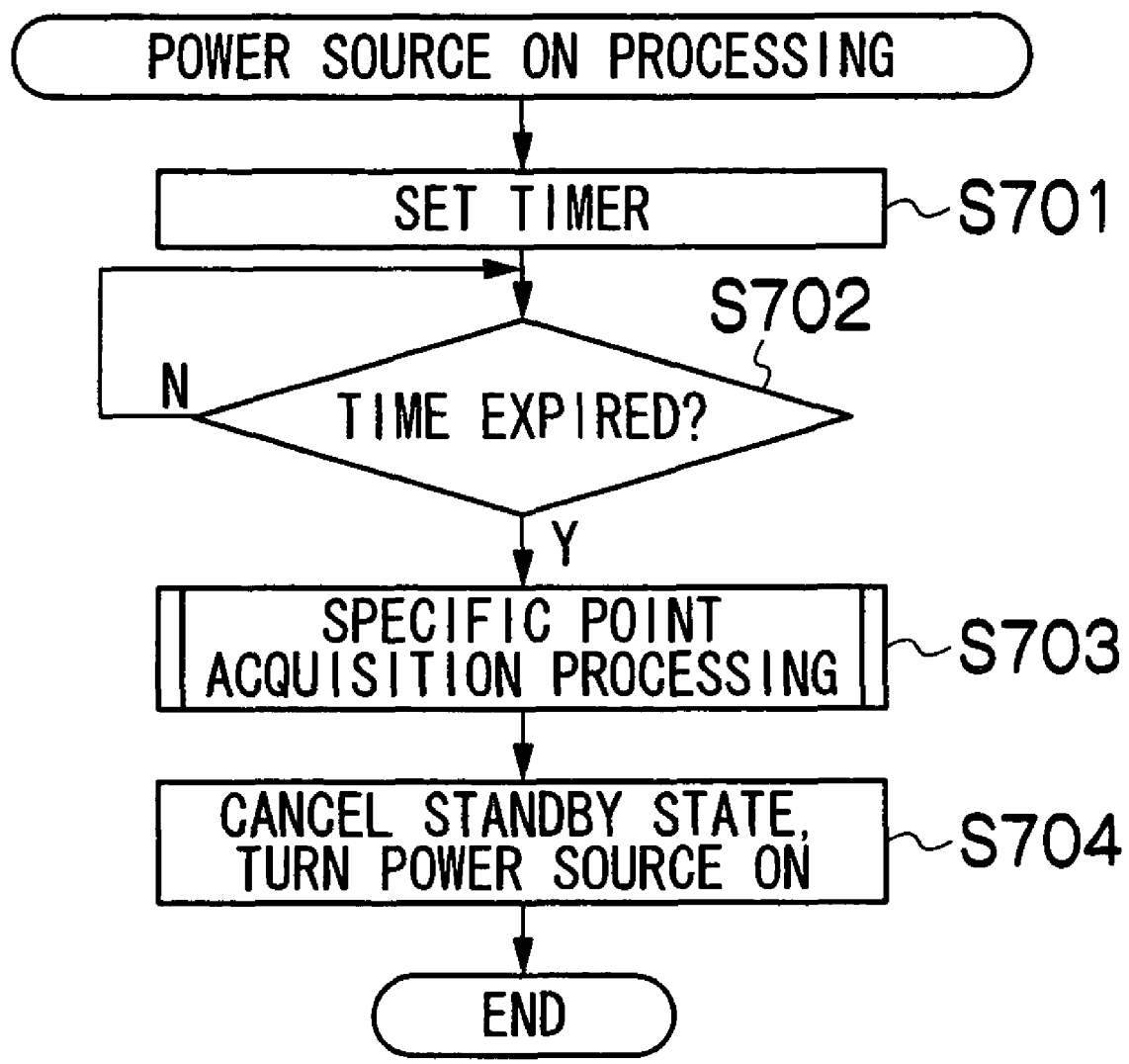
FIG. 14 is a flowchart showing the flow of power source on processing.

The above-described processings are processings showing the overall processing up through the sensing of the fingertip of the user and the sensing of operation thereof. Next, processings other than those described above will be described. FIG. 14 is a flowchart showing the flow of the processing of canceling a standby state (low electric power consumption mode) in a case in which the specific point is sensed again after a predetermined time period. This processing is processing which is inserted between above-described steps 101 and 102 of FIG. 5.

In step 701, the CPU 40 sets a timer. This timer is a timer which measures the time until the aforementioned specific point is sensed again after a predetermined time period. When the time on the timer expires in step 702, in step 703, the CPU 40 executes specific point acquisition processing, and in step 704, the CPU 40 cancels the standby state and turns the power source on (regular operation mode). For example, a state in which standby power is flowing at a television, and a suspend mode of a computer, are examples of this standby state.

In accordance with the above processings, a standby state can be set until a fingertip is sensed after a predetermined time period has elapsed from a fingertip being sensed. Therefore, wasteful consumption of electric power can be suppressed.

Figure 15:
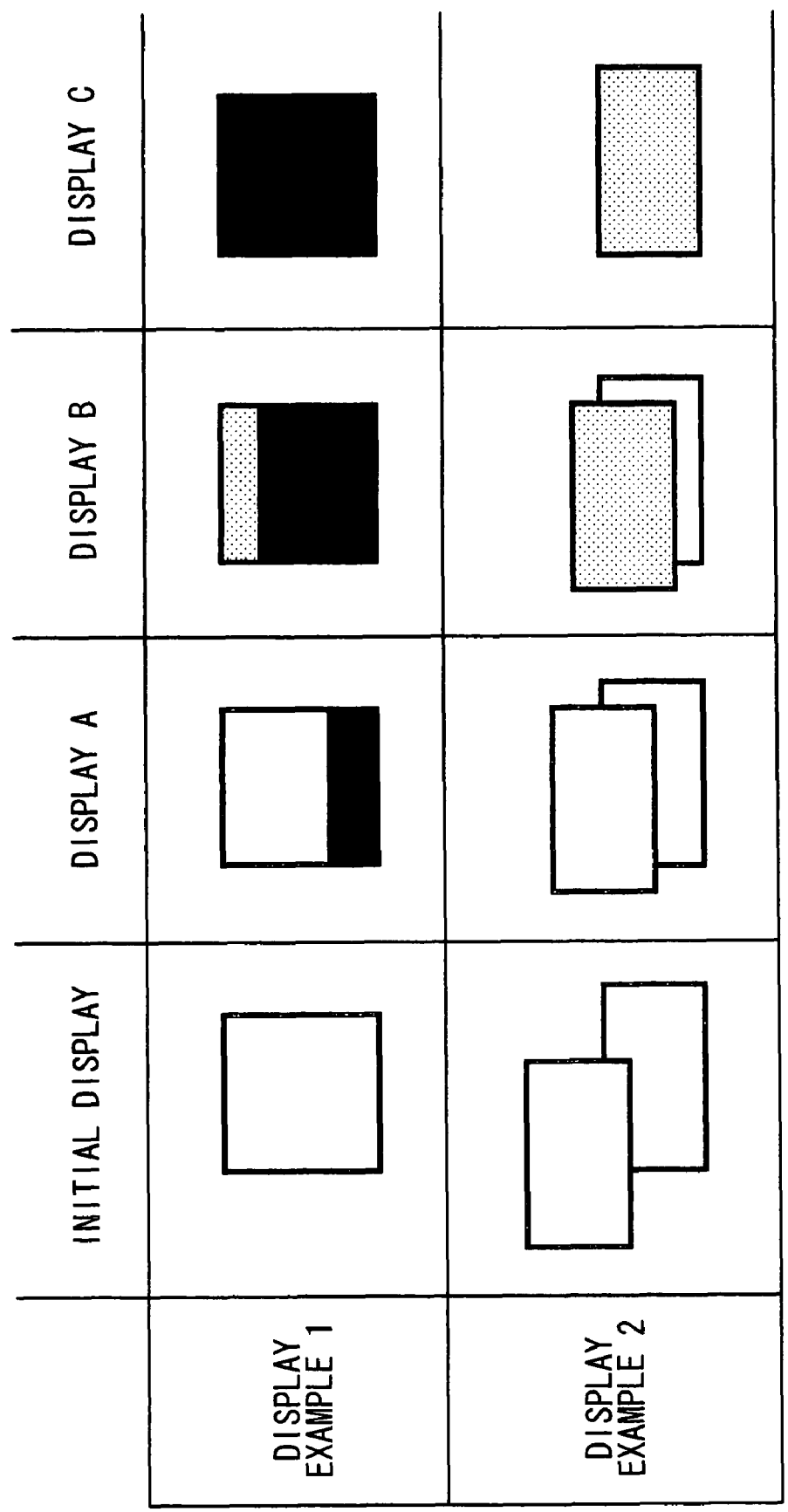
FIG. 15 is a schematic drawing showing staged display in two button display examples 1, 2.

The flow of processing, which displays a button in stages in accordance with the button pushing action by the user, will be described next. First, staged display, which displays a button in stages, will be described by using FIG. 15. FIG. 15 is a schematic drawing showing the staged display of two button display examples 1, 2. When the user pushes a button down by ⅓ for example, the display is updated from the initial display to the display shown as Display A. As shown in FIG. 15, both of display examples 1, 2 become different displays from the initial displays. Further, when the user pushes the button down by ⅔, the display is updated to the display shown as Display B. When the user fully depresses the button, the display is updated to the display shown as Display C.

Figure 16:
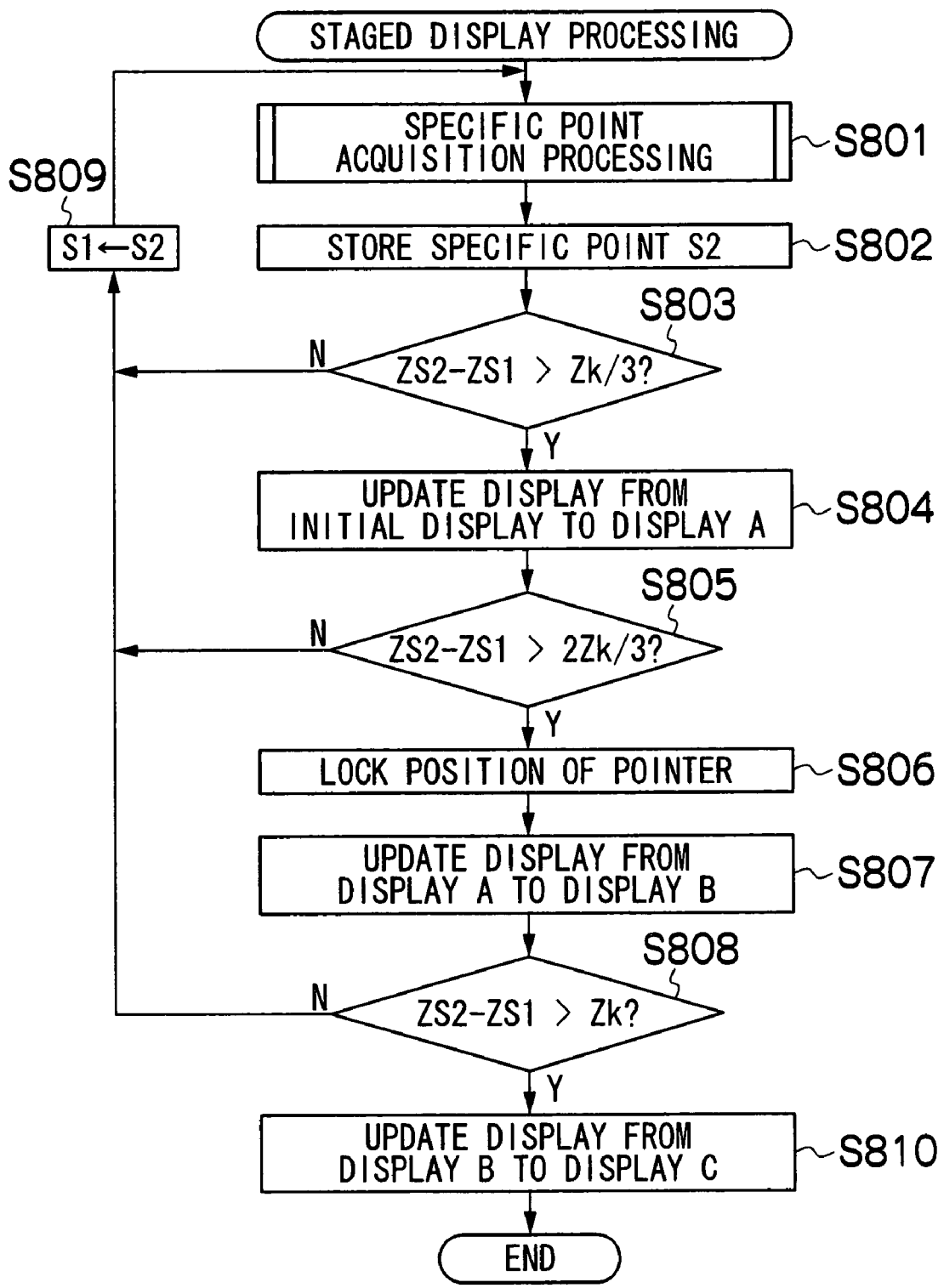
FIG. 16 is a flowchart showing the flow of staged display processing.

Updating the displayed button in this way in accordance with the button pushing action by the user is staged display. The flow of the staged display processing, which is the processing in the case in which this staged display is executed, will be explained by using the flowchart of FIG. 16. Note that this processing is processing which is executed in a case in which the specific point is obtained in advance as the specific point S1.

First, in step 801, the CPU 40 executes the specific point acquisition processing. In next step 802, the CPU 40 stores, as the specific point S2, the specific point which is acquired in step 801.

In subsequent step 803, the CPU 40 judges whether or not a value, which is equal to the Z-coordinate value ZS1 of the specific point S1 minus the Z-coordinate value ZS2 of the specific point S2, is greater than Zk/3. If the judgment in step 805 is negative, the CPU 40 replaces the specific point S1 with the specific point S2 in step 809. Note that the coordinate value Zk is the same value as the coordinate value Zk in step 605 described in FIG. 13.

If the judgment in step 803 is affirmative, in step 804, the CPU 40 updates the button display from the initial display to Display A.

Further, in step 805, the CPU 40 judges whether or not the value, which is equal to the Z-coordinate value ZS1 of the specific point S1 minus the Z-coordinate value ZS2 of the specific point S2, is greater than 2Zk/3. If the judgment in step 805 is negative, processing moves on to step 809.

If the judgment in step 805 is affirmative, in step 806, the CPU 40 locks (fixes) the position of the pointer, and in step 807, updates the button display from Display A to Display B. Here, locking the position of the pointer means that, even if the user's fingertip were to be moved from here in a direction along the planar direction of a cross-section which is a direction other than the Z-axis direction (i.e., in a direction along the planar direction of a plane at which the Z-axis is a normal line), the specific point would not move and the position of the pointer would not change. In this way, the operational ease for the user can be improved because it is fine even if the position of the fingertip shifts slightly while the user is in the midst of the pushing-down action.

In step 808, the CPU 40 judges whether or not the value, which is equal to the Z-coordinate value ZS1 of the specific point S1 minus the Z-coordinate value ZS2 of the specific point S2, is greater than Zk. If the judgment in step 808 is negative, processing moves on to step 809.

If the judgment in step 808 is affirmative, this means that the button is fully depressed, and therefore, in step 810, the CPU 40 updates the button display from Display B to Display C.

By displaying the button and making the amount of change in the display relatively match the amount of movement in the Z-axis direction, the user can understand the amount of movement in the Z-axis direction. Further, in the state of Display B, movement of the pointer is made impossible. This has the effect of preventing erroneous entry into the area corresponding to the adjacent button when moving in the Z-axis direction within the operation space. Note that, in a case in which the monitor 52 is a stereoscopic monitor, the amount of movement of the operation button may be made to match the coordinate value Zk.

Figure 17:
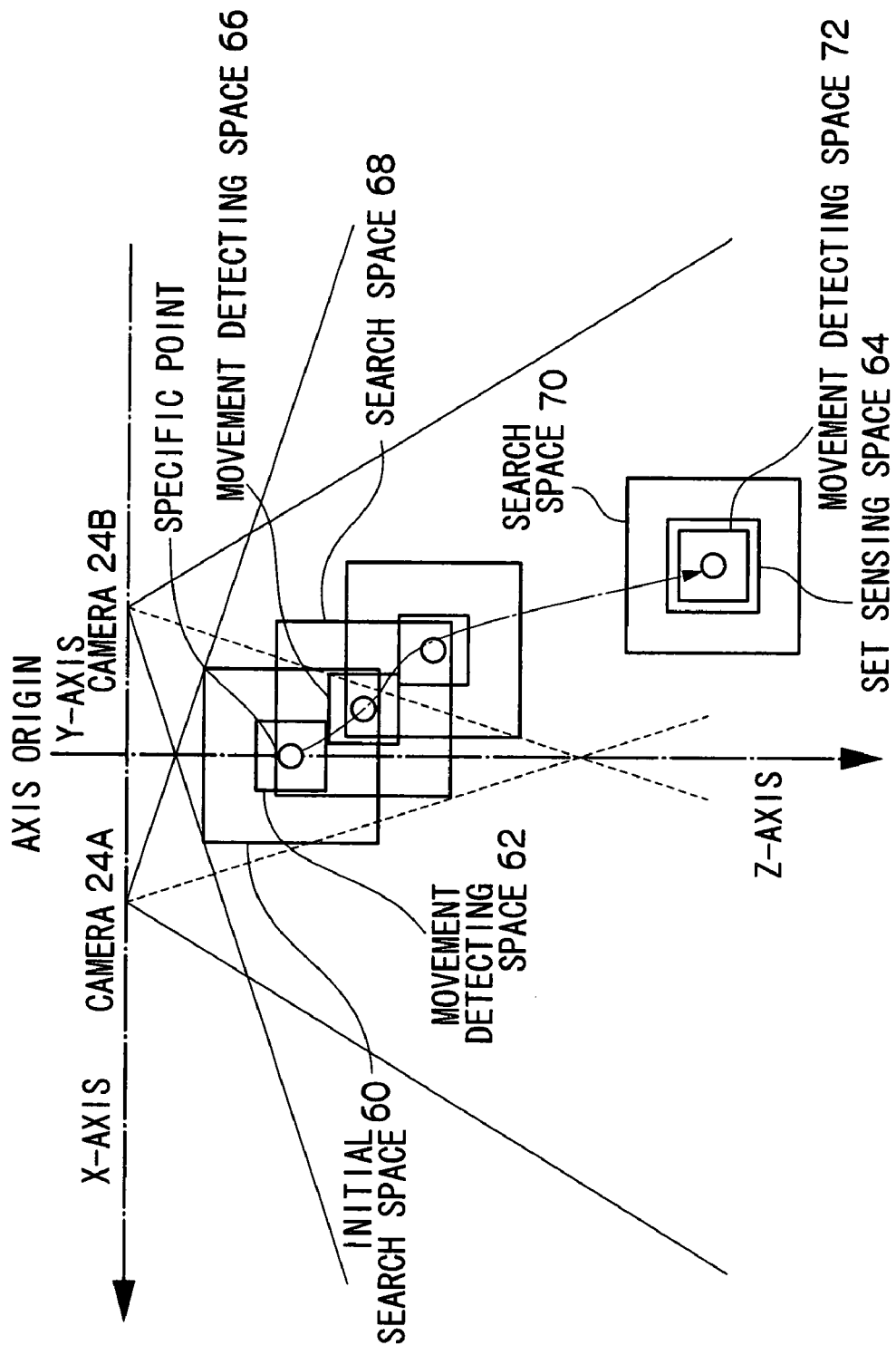
FIG. 17 is a drawing showing a state in which a search space moves in accordance with movement of the specific point, and a sensing space is finally set.

Next, the sensing space setting processing will be described. The sensing space setting processing is processing by which the user sets the position of the sensing space which is set at the time of start-up. Concrete description will be given by using FIG. 17. FIG. 17 is a drawing showing a state in which the search space moves in accordance with movement of the specific point, and the sensing space is finally set.

Specifically, FIG. 17 shows that, as the fingertip moves, a movement detecting space 62 which is included in an initial search space 60 moves, and a movement detecting space 66 and a search space 68 move, and finally, a sensing space 64 is set at a position shown by a search space 70 and a movement detecting space 72. Note that the search space is a space including the sensing space as described above, and the movement detecting space is a space for detecting the movement of the specific point. Further, the initial search space is a search space which is at a substantially uniform distance from each of the cameras 24 and is positioned in a vicinity of the monitor 52.

The flow of this sensing space setting processing will be described by using the flowchart of FIGS. 18 and 19. First, in step 901, the CPU 40 reads-in from the RAM 42 the coordinates of the initial search space. In next step 902, the CPU 40 executes the specific point acquisition processing (see FIG. 6). Subsequently, in step 903, the CPU 40 judges whether or not the specific point S1 acquired by the specific point acquisition processing exists within the initial search space.

If the judgment in step 903 is negative, the CPU 40 returns to the processing of step 902. If the judgment in step 903 is affirmative, the CPU 40 displays on the monitor 52 the fact that the specific point has been sensed. For this display, for example, "sensing confirmed" or the like may be displayed, or a predetermined sound may be emitted.

Next, in step 905, the CPU 40 updates the search space to a search space based on the specific point S1, and also sets the movement space. In the same way as the operation space, the sizes of the movement space in the XYZ directions are determined in advance on the basis of the specific point S1, and the movement space is set in accordance with the sizes by setting the respective points of the search space at the RAM 42 for example.

Next, the CPU 40 sets a timer in step 906. This timer is a timer for judging whether or not the user has fixed his/her fingertip at that position.

Figure 6:
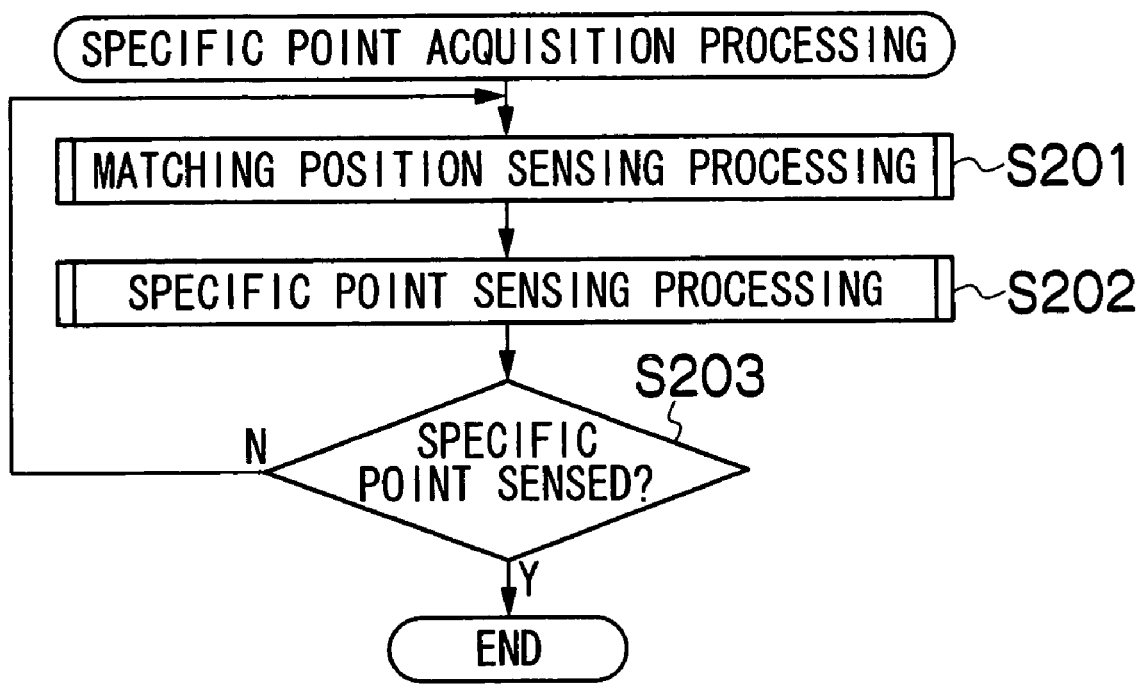
FIG. 6 is a flowchart showing the flow of specific point acquisition processing.

When it is judged in step 908 that the time on the timer has expired, in step 909, the CPU 40 executes the specific point acquisition processing (see FIG. 6). In subsequent step 910, the CPU 40 judges whether or not the specific point S2, which is acquired by the specific point acquisition processing, exists in the search space updated in step 905. This judgment is a judgment as to whether or not the fingertip is fixed at that position as described above.

If the judgment in step 910 is negative (i.e., if it is judged that the fingertip has moved outside of the range of the search space), in step 912, the CPU 40 judges whether or not the specific point S2 exists in the search space before the updating.

If the judgment in step 912 is affirmative, in step 914, the CPU 40 replaces the specific point S1 with the specific point S2, and the processing of step 905 is executed. If the judgment in step 912 is negative, in step 913, the CPU 40 resets the search space to the initial search space, and executes the processing of step 902.

The routine returns to step 910, and if the judgment in this step 910 is affirmative, in step 911, the CPU 40 judges whether or not the specific point S2 exists in the movement space which is included in the search space. If the judgment in step 911 is negative, the processing of step 914 is executed.

Figure 19:
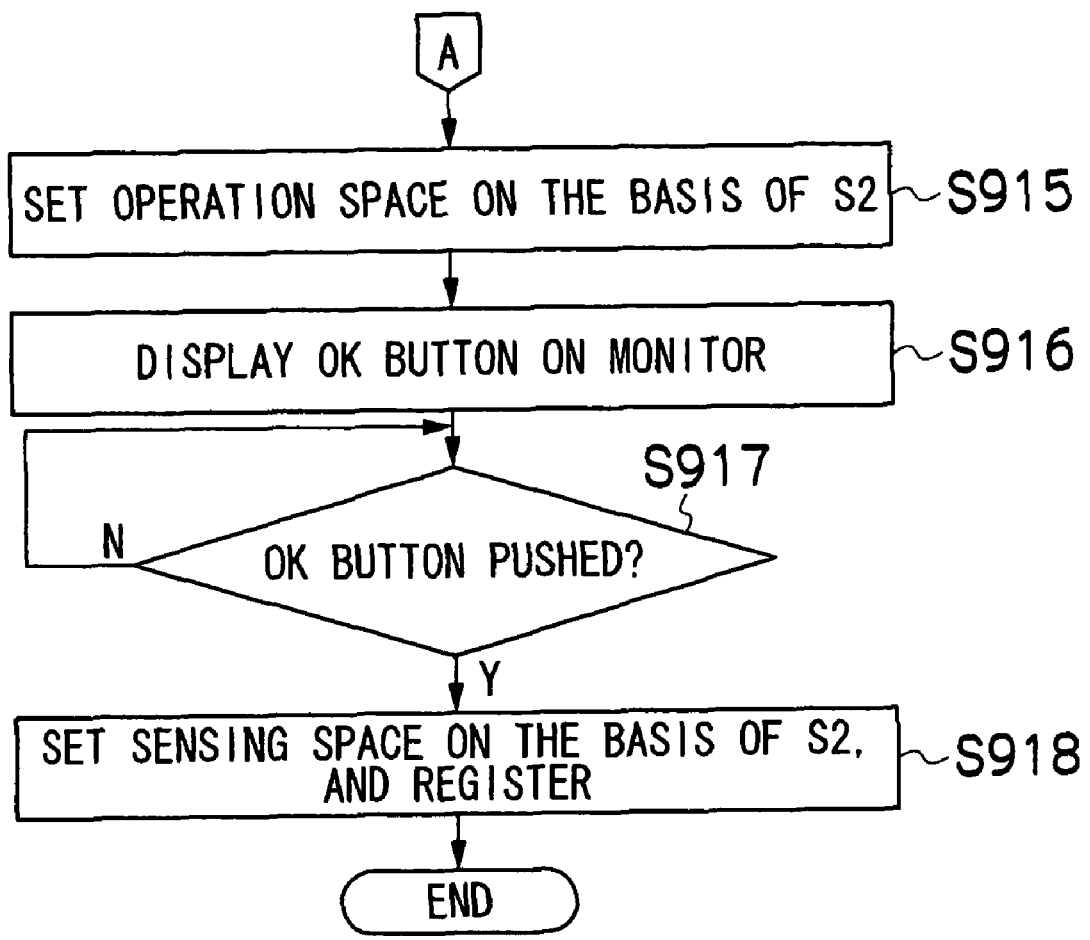
FIG. 19 is part 2 of the flowchart showing the flow of the sensing space setting processing.

On the other hand, if the judgment in step 911 is affirmative, processing proceeds to step 915 of FIG. 19. In step 915, the CPU 40 sets the operation space on the basis of the specific point S2. Then, in step 916, the CPU 40 displays an OK button on the monitor 52. This OK button is a button for having the user confirm whether or not the current specific point (fingertip) is satisfactory. In step 917, if the OK button is pushed, in step 918, the CPU 40 sets the sensing space on the basis of the specific point S2, and registers the coordinate values of the vertices of this sensing space as the new sensing space.

The above processings describe an example of registering the sensing space at one place, but, by repeating the above-described method or by continuing after registration at one place, sensing spaces at plural positions can be registered.

Further, for example, a second sensing space can be applied to the control of a peripheral device which is connected to the present image processing device. Specific examples include a device having a monitor, such as an interphone equipped with a camera or the like, or an air conditioner, or the like.

Moreover, the initial search space may be set at a position which is at the center of the monitor 52 and near to the monitor 52. In this way, the user can easily understand the position. Further, it is usually the case that no obstacle exists at the center of the monitor 52. Therefore, by setting the initial search space at the aforementioned position, the possibility that an obstacle will be sensed can be lowered.

Figure 20:
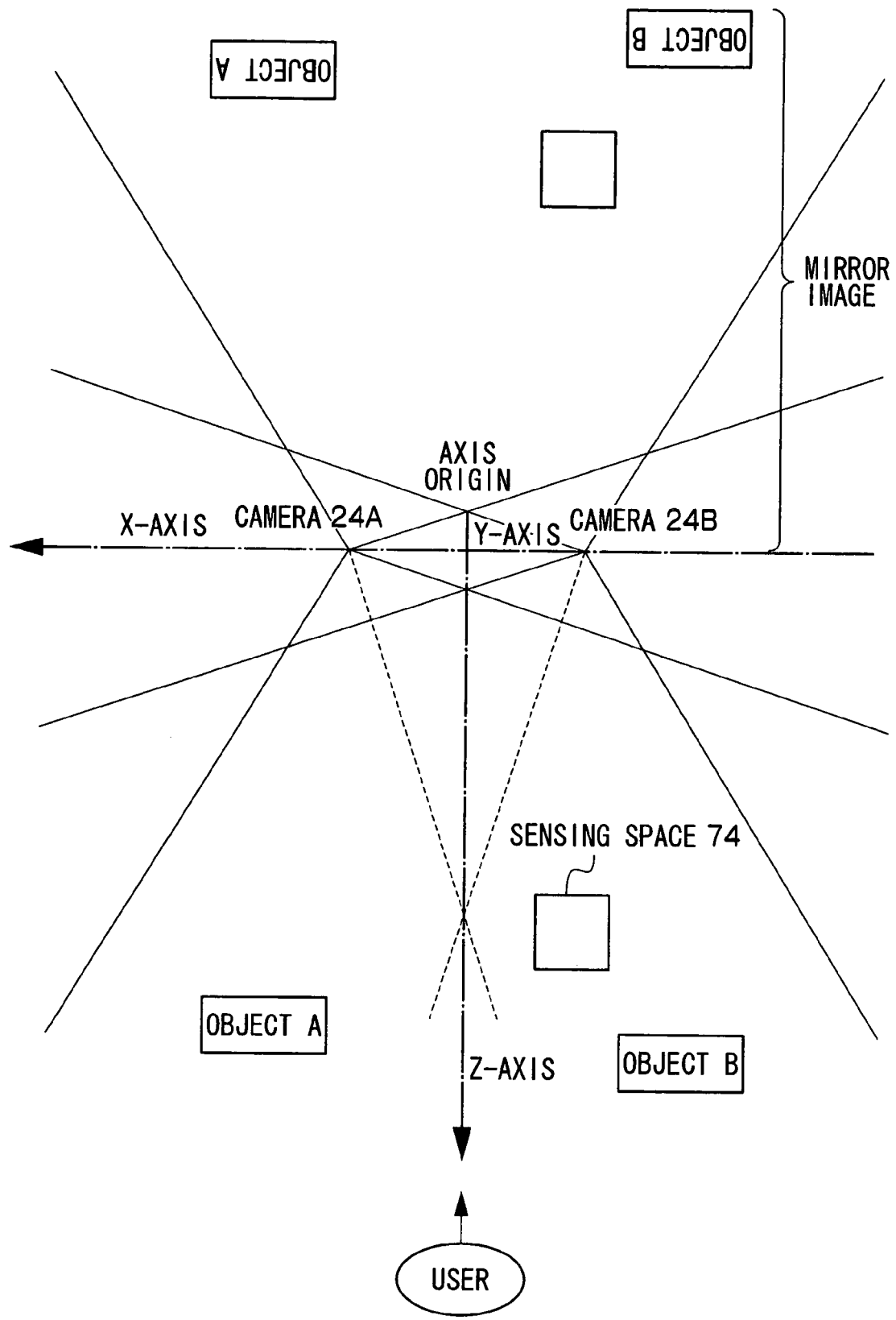
FIG. 20 is a drawing showing an example of a registered position of the sensing space.

Processing for making the user confirm the position of the sensing space will be described next. For example, it is assumed that the sensing space is registered at the position of a sensing space 74 as shown in FIG. 20. In order to show the user the sensing space which is registered in this way, the image A obtained from the camera 24A and the image B obtained from the camera 24B are displayed on the monitor 52 as shown in FIG. 21.

Figure 21:
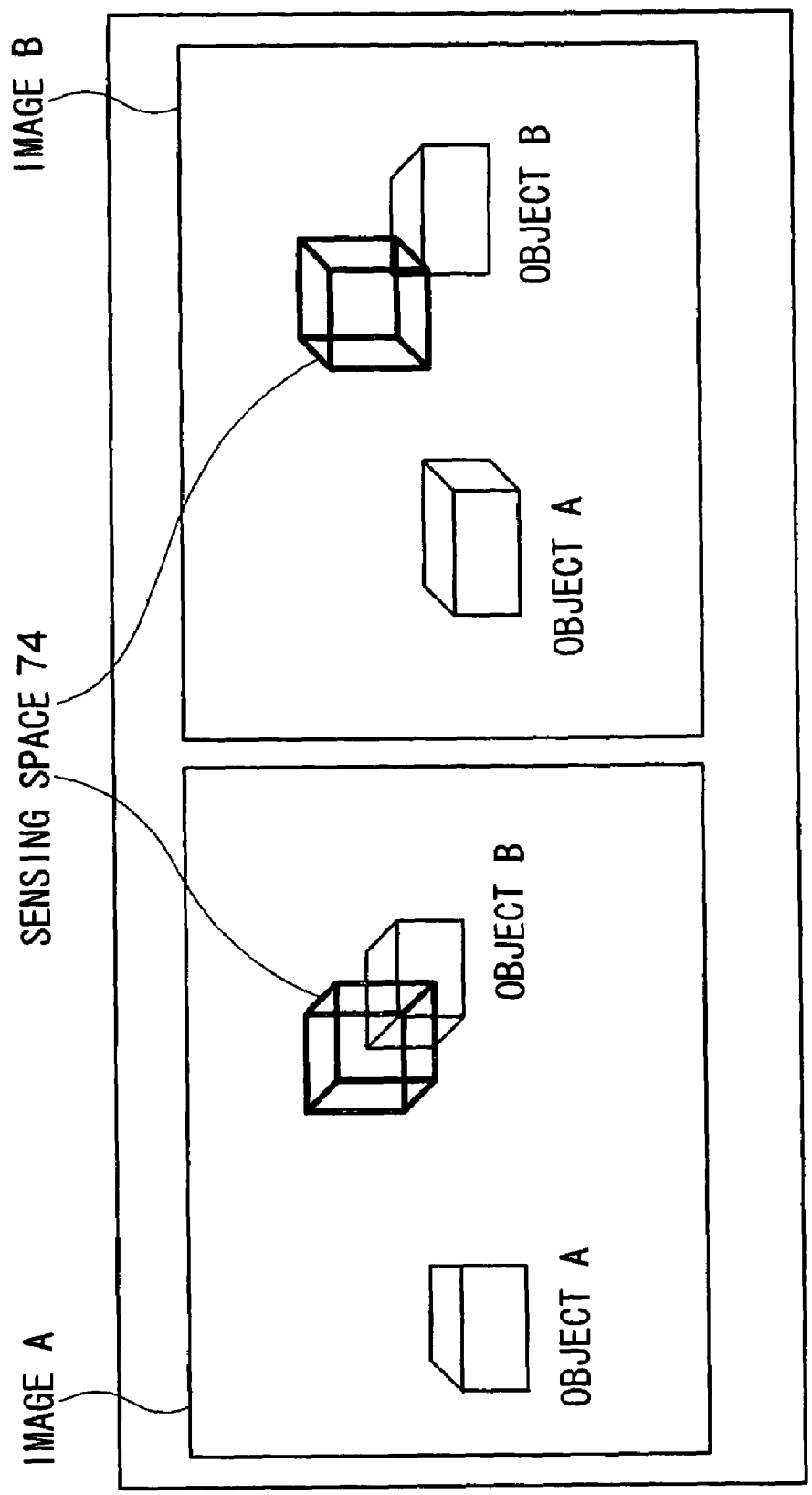
FIG. 21 shows display examples of image A and image B for confirming the sensing space.

As shown in FIG. 21, the sensing space 74 is displayed as a wireframe image. Further, because the images obtained from the cameras 24A, 24B are images photographed from the direction directly opposite to the user, these images are displayed as images which have been converted into mirror images, for easier understanding by the user. In this way, as shown in FIG. 21, it is possible to provide images seen from the user's side.

Figure 22:
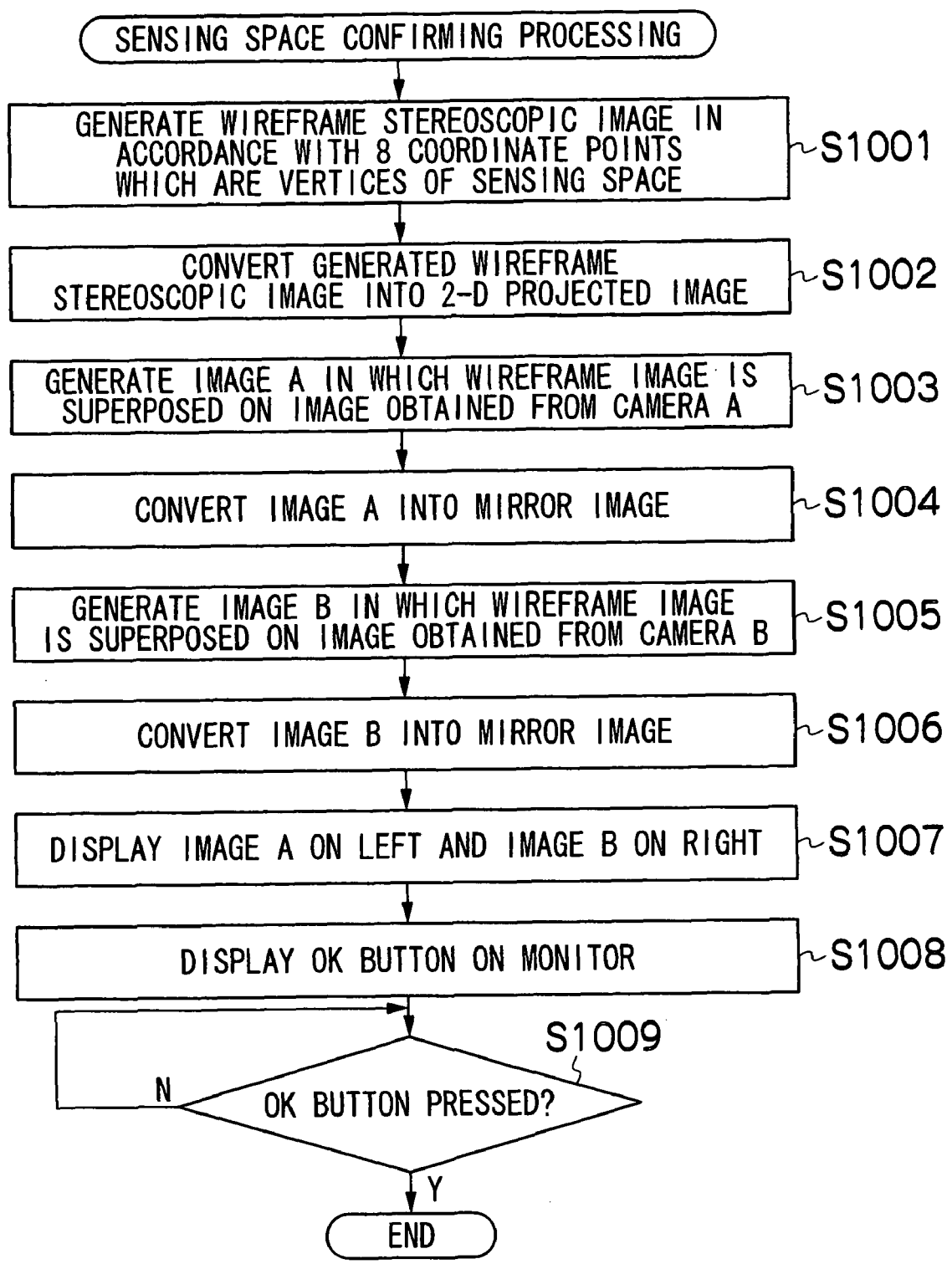
FIG. 22 is a flowchart showing the flow of sensing space confirming processing.

The flow of the sensing space confirming processing will be described by using the flowchart of FIG. 22. First, in step 1001, the CPU 40 generates a wireframe stereoscopic image in accordance with the eight coordinate points which are the vertices of the sensing space. In next step 1002, the CPU 40 converts the generated wireframe stereoscopic image into a two-dimensional projected image and obtains a wireframe image.

In next step 1003, the CPU 40 generates the image A, in which the wireframe image is superposed on the image obtained from camera A. In step 1004, the CPU 40 makes the image, which is the image A converted into a mirror image, newly be image A.

Similarly, in step 1005, the CPU 40 generates the image B, in which the wireframe stereoscopic image is superposed on the image obtained from camera B. In step 1006, the CPU 40 makes the image, which is the image B converted into a mirror image, newly be image B.

Next, in step 1007, the CPU 40 displays, on the monitor 52, the image A obtained by the above-described processing at the left and the image B at the right. In step 1008, the CPU 40 displays the OK button on the monitor 52. When it is judged in step 1009 that the OK button has been pressed, the CPU 40 ends processing.

As described above, by making the displayed images be mirror images, the user can easily grasp the left/right positional relationship, and can confirm the position of the sensing space. Note that the present exemplary embodiment shows an example in which the images obtained by the two cameras are displayed on the monitor 52, but it is possible to display only either one of the images.

Figure 18:
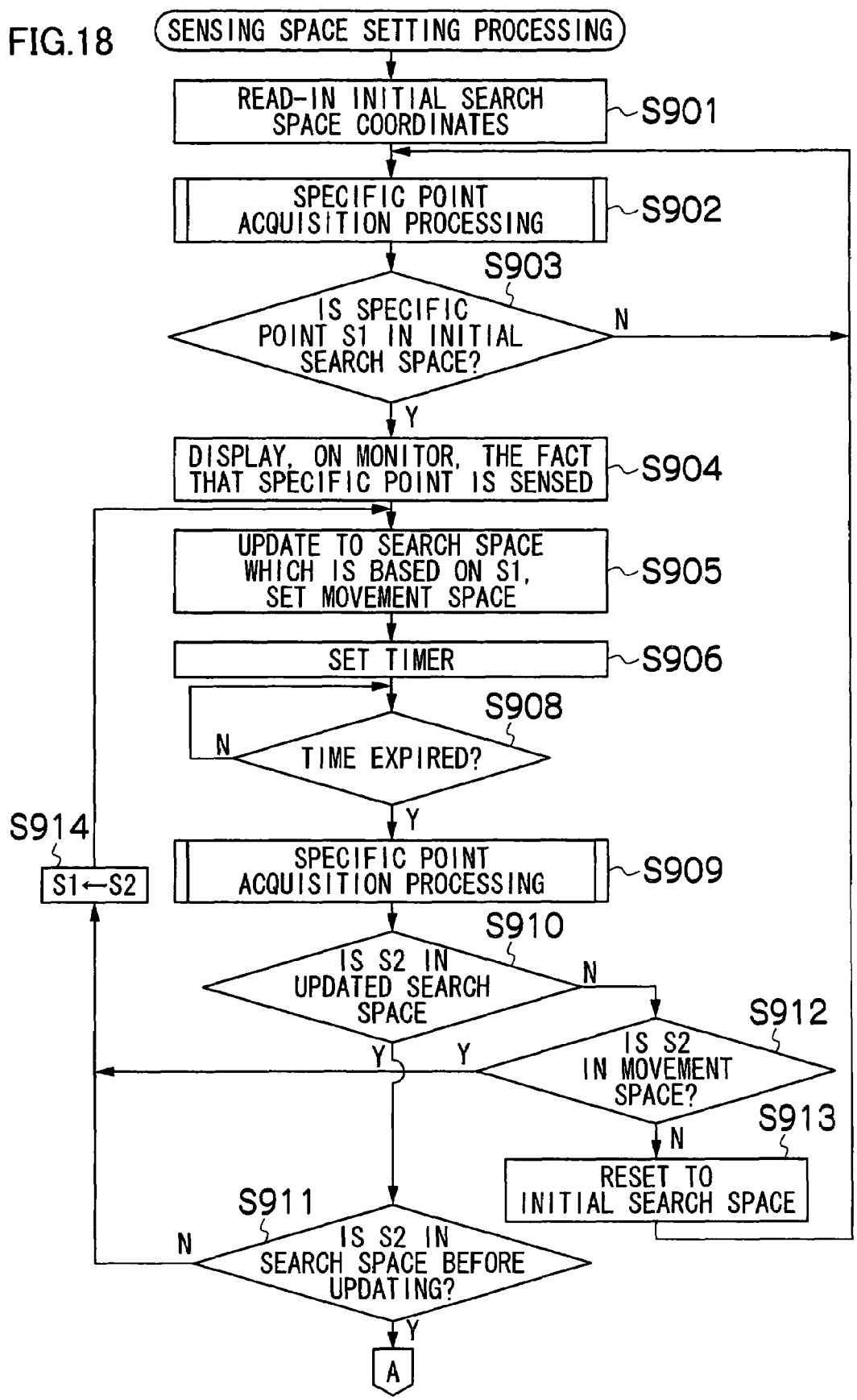
FIG. 18 is part 1 of a flowchart showing the flow of sensing space setting processing.

Further, the display of the above-described images for confirming the sensing space may be a display similar to that at the time of the sensing space position registration (refer to FIGS. 18 and 19).

Figure 23:
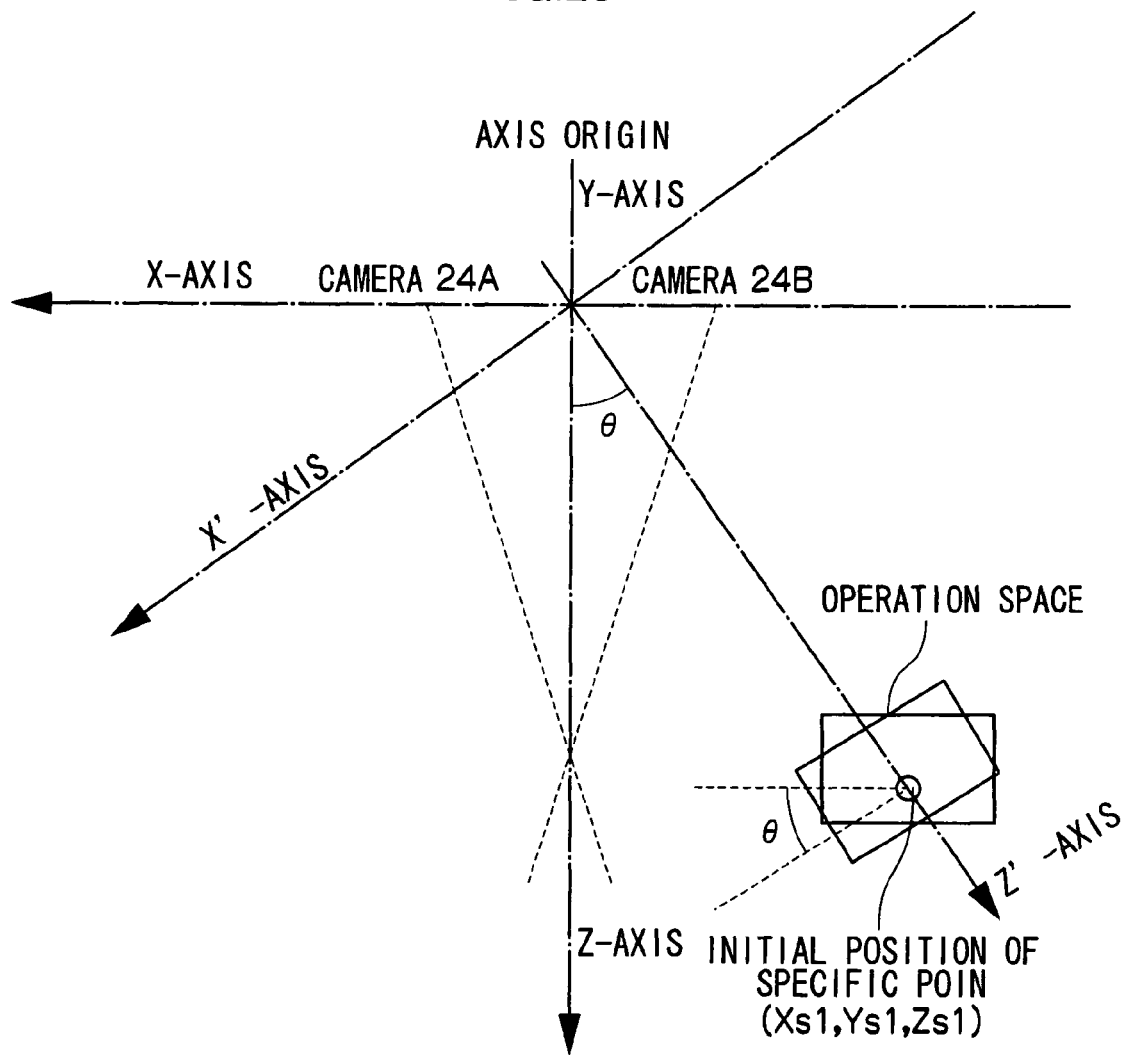
FIG. 23 is a drawing showing a rotation example of the operation space and coordinate axes.

Next, processing for rotation-converting a three-dimensional space and an operation space in accordance with the position of the user will be described. In a case in which the user carries out an operation within the operation space, the line of sight of the user is directed toward the monitor 52. In this case, as shown in FIG. 23 for example, if the user carries out operation at a position away from the Z-axis, because the operation space is structured by planes which are parallel to the X, Y, Z axes, the user must move the motion of his/her hand or arm at an angle. Therefore, operation is difficult for the user, and this is a cause of bringing about erroneous operation.

Accordingly, by rotating the XZ coordinate axes and the operation space by an angle θ which is formed by the Z-axis and a line segment connecting the origin and a coordinate in which the Y coordinate of the specific point is made to be 0, there is formed a coordinate system in which it is easy for the user to operate.

Figure 24:
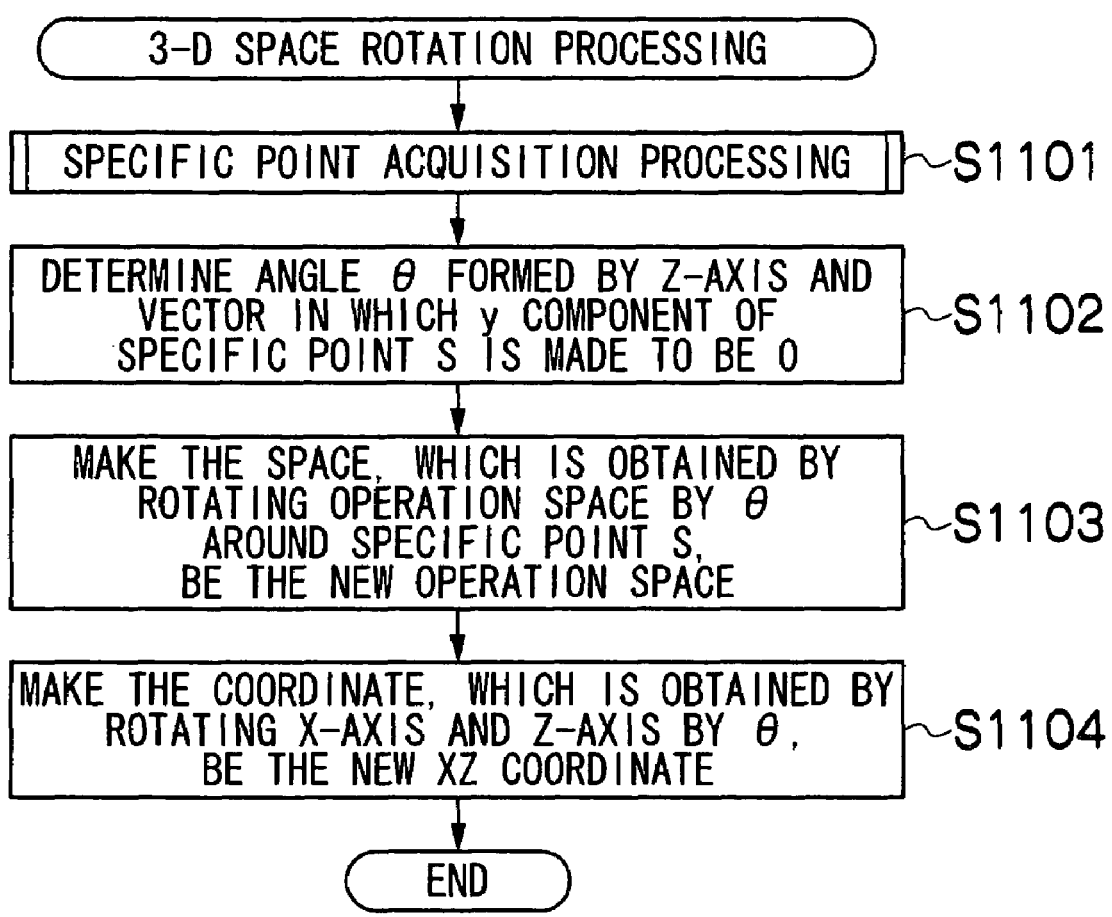
FIG. 24 is a flowchart showing the flow of three-dimensional space rotation processing.

The flow of this three-dimensional space rotating processing will be described by using the flowchart of FIG. 24. First, in step 1101, the CPU 40 executes the specific point acquisition processing (see FIG. 6). In step 1102, the CPU 40 determines the angle θ which is formed by the Z-axis and a vector in which the y component of the specific point S acquired in the specific point acquisition processing is made to be 0.

In next step 1103, the CPU 40 makes a space, which is obtained by rotating the operation space by the angle θ around the specific point S, be the new operation space. In step 1104, the CPU 40 makes the coordinate, which is obtained by rotating the X-axis and the Z-axis by the angle θ, be the new XZ coordinate. Namely, an X'YZ' space is obtained as the new three-dimensional space.

In this way, in the above-described three-dimensional space rotating processing, processing, which rotates a three-dimensional space and makes it a new three-dimensional space, is executed in accordance with the positional relationship between the specific point and the origin of the three-dimensional space.

Owing to the above-described conversion, operation is easier for the user. Further, because the new X'YZ' coordinate becomes the same coordinate as the above-described XYZ coordinate, the processings described in the present exemplary embodiment can be applied as they are.

Figure 2:
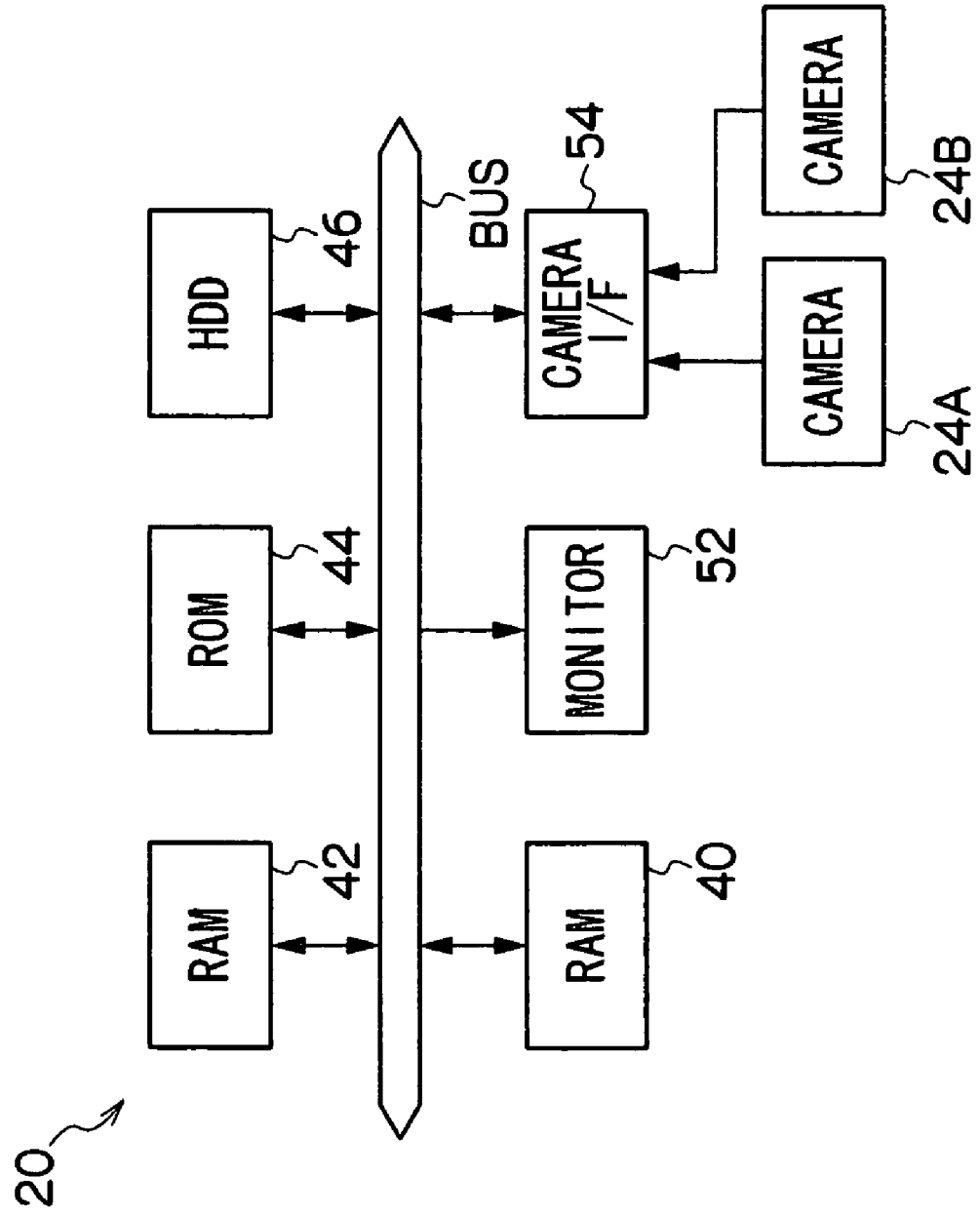
FIG. 2 is a drawing showing the hardware structure of the image processing device.

The image processing device relating to the above-described present exemplary embodiment can be applied not only as one device such as described in FIG. 2, but also to forms in which the monitor and the control unit are in different housings such as a thin television and a personal computer for example.

Moreover, there is no need for the plural cameras to be structured integrally with the present device, and plural camera units such as web cameras or the like can be used. Further, it is preferable that the characteristics of the plural cameras (the optical performance, the image pickup element performance, and the like) be the same.

Further, a screen which models the remote controller of a television is explained in FIG. 12 as an example of the operation screen. By displaying a remote controller in this way, there is no need for the user to set a remote controller nearby, and losing the remote controller, operation becoming impossible due to the batteries wearing out, and the like can be avoided.

As described above, the present exemplary embodiment has a plurality of image pickup sections (cameras 24) that pick-up, from respectively different positions, a same object of sensing which carries out an instructing action, and outputting image information expressing images in which the object of sensing is included; a position information sensing section (step 201) which, by carrying out stereo matching on the plurality of image information outputted from the plurality of image pickup sections by using, as an object, two-dimensional regions, which are regions that are more narrow than a common region included commonly in each of the plurality of images expressed by the plurality of image information, and which correspond to a search space which is a three-dimensional space set in advance as a space in which the instructing action can be carried out, senses position information expressing matching positions which are positions of the object of sensing in the three-dimensional space at points corresponding to one another in the two-dimensional regions; and a specific position sensing section (step 202) that senses, among the matching positions expressed by the position information sensed by the position information sensing section, a specific position which is a matching position which matches predetermined conditions.

Further, in the present exemplary embodiment, the specific position that is sensed by the specific position sensing section is a position within a sensing space included in the search space, the sensing space is a space within a rectangular parallelepiped, and the predetermined conditions are that the position information sensed at the position information sensing section exists within the rectangular parallelepiped, and that, in a case in which the matching position does not exist on one surface of two, predetermined, opposing surfaces among surfaces of the rectangular parallelepiped (step 402: Ymax<Y2−k) but exists within a predetermined distance from another surface (step 402: Ymin<Y1+a), the matching position which is nearest to the one surface is made to be the specific position (step 407).

The present exemplary embodiment further has a consumed electric power controlling section (power source on processing) which controls an amount of electric power consumed by the image processing device, wherein the consumed electric power controlling section cancels (step 704) a low electric power consumption mode when the low electric power consumption mode is set and, after a predetermined time period has elapsed after the specific position sensing section senses the specific position, the specific position sensing section again senses the specific position.

Further, the present exemplary embodiment further has: a deriving section (step 603) that derives a state amount which expresses a state of movement of the specific position sensed by the specific position sensing section; and a sensing section (step 605) that senses the instructing action on the basis of the state amount derived by the deriving section.

Moreover, in the present exemplary embodiment, the instructing action is an action which instructs execution of an operation processing which carries out a predetermined operation, and the image processing device further includes: a display section (monitor 52); a control section (CPU 40) that effects control such that a predetermined screen corresponding to a cross-section of the three-dimensional space is displayed in a display region of the display section; and a storing section (RAM 42) in which the operation processing is stored in advance in association with respective partial regions obtained by dividing the predetermined screen into a plurality of regions, wherein, on the basis of position information of the specific position sensed by the specific position sensing section, the deriving section derives (step 603) an amount of movement of the specific position along a direction normal to the cross-section, as the state amount which expresses the state of movement of the specific position at a time when the object of sensing moves, and when the amount of movement exceeds a predetermined amount (Y in step 605), the sensing section senses (step 606), as the instructing action, an action instructing execution of the operation processing which is stored in association with a partial region corresponding to a position in the cross-section of the specific position at that point in time.

Still further, in the present exemplary embodiment, the control section further effects control such that a position-indicating image (pointer) which shows a position of the specific position is displayed at a corresponding position of the specific position in the predetermined screen, and such that a state-indicating portion (button), which shows the state of movement of the specific position, is displayed at each partial region, and the control section further effects control such that a displayed state of at least one of the position-indicating image (pointer) and the state-indicating portion (button), which is displayed at the partial region at a position where the position-indicating image is displayed, changes in accordance with the amount of movement.

In the present exemplary embodiment, the control section prohibits (step 806) movement of the specific position along a planar direction of the cross-section, immediately before the amount of movement reaches the predetermined amount.

Further, in the present exemplary embodiment, the control section further effects control such that boundary lines (the dashed lines in FIG. 12), which partition the plurality of partial regions, are displayed on the predetermined screen.

The present exemplary embodiment further has a sensing space setting section (sensing space setting processing) which sets a position of the sensing space, wherein the sensing space setting section moves a search space, which is substantially an equal distance from each of the image pickup sections and which is positioned in a vicinity of the display section, in accordance with the specific position sensed by the specific position sensing section, and sets, as a position of the sensing space, the specific position at a time when the specific position has not moved for a predetermined time period (Y in step 901).

Further, in the present exemplary embodiment, the control section effects control such that an image, which is expressed by image information outputted from the image pickup section, and a two-dimensional image, which projects the rectangular parallelepiped expressing the sensing space, are superposed (steps 1003, 1005), and a mirror image, which is obtained by mirror-image-converting (steps 1004, 1006) an image obtained by the superposing, is displayed at a display region of the display section (step 1007).

Moreover, the present exemplary embodiment further has a coordinate rotating section (three-dimensional space rotation processing) which, in accordance with a positional relationship between the specific position sensed by the specific position sensing section and an origin of the three-dimensional space, rotates the three-dimensional space and makes it a new three-dimensional space.

In the present exemplary embodiment, the position information sensing section compares (step 308), for each of the image information outputted from the same image pickup section, the plurality of image information (image data A1, B1 of step 304) outputted from the plurality of image pickup sections and the plurality of image information (image data A2, B2 of step 307) outputted from the plurality of image pickup sections after a predetermined time period has elapsed, and executes the stereo matching (step 309) in a case in which different image information exist (Y in step 308).

Note that the flows of the processings of the above-described flowcharts are examples, and the order of the processings may be changed, new steps may be added, and unnecessary steps may be deleted, within a scope which does not depart from the gist of the present invention.

What is claimed is:

1. An image processing device comprising:
   a plurality of image sensors that capture, from respectively different positions, a same object of sensing which carries out an instructing action, and that output image information expressing images in which the object of sensing is included;
   a position information sensing section which, by carrying out stereo matching on the plurality of image information outputted from the plurality of image sensors, using, as an object, two-dimensional regions, which are regions that are narrower than a common region included commonly in each of the plurality of images expressed by the plurality of image information, and which correspond to a search space which is a three-dimensional space set in advance as a space in which the instructing action is to be carried out in order to issue an instruction, senses position information expressing matching positions, which are positions of the object of sensing in the three-dimensional space at points corresponding to one another in the two-dimensional regions; and a specific position sensing section that senses, among the matching positions expressed by the position information sensed by the position information sensing section, a specific position which is a matching position that matches predetermined conditions, wherein:

the specific position that is sensed by the specific position sensing section is a position within a sensing space included in the search space, the sensing space is a space within a rectangular parallelepiped, and the predetermined conditions are that the position information sensed at the position information sensing section exists within the rectangular parallelepiped, and that, in a case in which the matching position does not exist on one surface of two predetermined, opposing surfaces among surfaces of the rectangular parallelepiped, but exists within a predetermined distance from another surface, the matching position which is nearest to the one surface is made to be the specific position.

2. The image processing device of claim 1, further comprising:

a consumed electric power controlling section which controls an amount of electric power consumed by the image processing device, wherein the consumed electric power controlling section cancels a low electric power consumption mode when the low electric power consumption mode is set and, after a predetermined time period has elapsed after the specific position sensing section senses the specific position, the specific position sensing section again senses the specific position.

3. The image processing device of claim 1, further comprising:

a deriving section that derives a state amount which expresses a state of movement of the specific position sensed by the specific position sensing section; and a sensing section that senses the instructing action based on the state amount derived by the deriving section.

4. The image processing device of claim 1, further comprising a coordinate rotating section which, in accordance with a positional relationship between the specific position sensed by the specific position sensing section and an origin of the three-dimensional space, rotates the three-dimensional space thereby yielding a new three-dimensional space.

5. The image processing device of claim 1, wherein the position information sensing section compares, for each of the image information outputted from a same image sensor, the plurality of image information outputted from the plurality of image sensors and the plurality of image information outputted from the plurality of image sensors after a predetermined time period has elapsed, and executes the stereo matching in a case in which image information differs.

6. An image processing device comprising:

a plurality of image sensors that capture a same object of sensing from respectively different positions, and that output image information expressing images that include the object of sensing, wherein the object of sensing carries out an instructing action that instructs execution of an operation processing which carries out a predetermined operation;

a position information sensing section that carries out stereo matching on the plurality of image information outputted from the plurality of image sensors, using, as an object, two-dimensional regions, which are regions that are narrower than a common region included commonly in each of the plurality of images expressed by the plurality of image information, and which correspond to a search space that is a three-dimensional space set in advance as a space in which the instructing action is to be carried out in order to issue an instruction, the position information sensing section thereby sensing position information expressing matching positions, which are positions of the object of sensing in the three-dimensional space at points corresponding to one another in the two-dimensional regions;

a specific position sensing section that senses, among the matching positions expressed by the position information sensed by the position information sensing section, a specific position, wherein the specific position is a matching position that matches predetermined conditions;

a display section;

a control section that effects control such that a predetermined screen corresponding to a cross-section of the three-dimensional space is displayed in a display region of the display section;

a storing section in which the operation processing is stored in advance in association with respective partial regions obtained by dividing the predetermined screen into a plurality of regions;

a deriving section that derives, based on position information of the specific position sensed by the specific position sensing section, an amount of movement of the specific position along a direction normal to the cross-section, as a state amount that expresses a state of movement of the specific position at a time when the object of sensing moves; and a sensing section that senses the instructing action based on the state amount derived by the deriving section, such that, when the amount of movement exceeds a predetermined amount, the sensing section senses, as the instructing action, an action instructing execution of the operation processing that is stored in association with a partial region that corresponds to a position of the specific position in the cross-section at that point in time.

7. The image processing device of claim 6, wherein the control section further effects control such that a position-indicating image, which shows a position of the specific position, is displayed at a corresponding position of the specific position in the predetermined screen, and such that a state-indicating portion, which shows the state of movement of the specific position, is displayed at each partial region, and the control section further effects control such that a displayed state of at least one of the position-indicating image or the state-indicating portion, displayed at the partial region at a position where the position-indicating image is displayed, changes in accordance with the amount of movement.

8. The image processing device of claim 7, wherein the control section prohibits movement of the specific position along a planar direction of the cross-section, immediately before the amount of movement reaches the predetermined amount.

9. The image processing device of claim 6, wherein the control section prohibits movement of the specific position along a planar direction of the cross-section, immediately before the amount of movement reaches the predetermined amount.

10. The image processing device of claim 6, wherein the control section further effects control such that boundary lines, which partition the plurality of partial regions, are displayed on the predetermined screen.

11. The image processing device of claim 6, further comprising a sensing space setting section which sets a position of a sensing space,
wherein the sensing space setting section moves a search space, which is substantially an equal distance from each of the image sensors and which is positioned in a vicinity of the display section, in accordance with the specific position sensed by the specific position sensing section, and sets, as a position of the sensing space, the specific position at a time when the specific position has not moved for a predetermined time period.

12. The image processing device of claim 6, wherein the control section effects control such that an image, which is expressed by image information outputted from the image sensor, and a two-dimensional image, which projects a rectangular parallelepiped expressing a sensing space, are superposed, and a mirror image, which is obtained by mirror-image-converting an image obtained by the superposing, is displayed at a display region of the display section.

13. The image processing device of claim 6, further comprising a coordinate rotating section which, in accordance with a positional relationship between the specific position sensed by the specific position sensing section and an origin of the three-dimensional space, rotates the three-dimensional space thereby yielding a new three-dimensional space.

14. The image processing device of claim 6, wherein the position information sensing section compares, for each of the image information outputted from a same image sensor, the plurality of image information outputted from the plurality of image sensors and the plurality of image information outputted from the plurality of image sensors after a predetermined time period has elapsed, and executes the stereo matching in a case in which image information differs.

* * * * *